US012572163B2

(12) United States Patent
Renner

(10) Patent No.: US 12,572,163 B2
(45) Date of Patent: Mar. 10, 2026

(54) PRESSURE REDUCER ASSEMBLY

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/588,780

(22) Filed: Feb. 27, 2024

(65) Prior Publication Data

US 2024/0288888 A1 Aug. 29, 2024

(30) Foreign Application Priority Data

Feb. 28, 2023 (EP) .................................... 23159179

(51) Int. Cl.
| | |
|---|---|
| *G05D 16/10* | (2006.01) |
| *F16K 1/52* | (2006.01) |
| *G05D 16/06* | (2006.01) |

(52) U.S. Cl.
CPC ........... *G05D 16/103* (2013.01); *F16K 1/523* (2013.01); *G05D 16/0608* (2013.01); *Y10T 137/7782* (2015.04); *Y10T 137/7808* (2015.04)

(58) Field of Classification Search
CPC .. F16K 1/523; G05D 16/0608; G05D 16/103; Y10T 137/7782; Y10T 137/7793; Y10T 137/7797; Y10T 137/7808
See application file for complete search history.

(56) References Cited

U.S. PATENT DOCUMENTS

| | | | | |
|---|---|---|---|---|
| 892,450 | A * | 7/1908 | Robinson ............. | G05D 16/103 |
| | | | | 251/284 |
| 4,516,600 | A * | 5/1985 | Sturman .............. | G05D 16/106 |
| | | | | 137/220 |
| 7,261,119 | B2 | 8/2007 | Olds | |
| 2004/0206401 | A1 | 10/2004 | Hecking | |
| 2005/0121083 | A1* | 6/2005 | Carroll ................. | G05D 16/103 |
| | | | | 137/505.25 |
| 2012/0227838 | A1* | 9/2012 | Ungerecht ............. | F16K 1/123 |
| | | | | 137/528 |

FOREIGN PATENT DOCUMENTS

EP            1173808 B1      3/2004

* cited by examiner

*Primary Examiner* — Robert K Arundale
(74) *Attorney, Agent, or Firm* — Burr & Forman

(57) ABSTRACT

A pressure reducer assembly (100) for adjustably reducing a pressure of a fluid includes a pressure reducer body (110) defining at least a part of a pressure reducer chamber (120) along a central axis (X-X'). The pressure reducer chamber (120) includes an inlet section (122) and an outlet section (124) fluidly coupled with the inlet section (122). A biasing means piston rod (132) having a center (Y) along the central axis (X-X') connects the inlet section (122) with the outlet section (124) and is axially moveable with respect to the pressure reducer body (110). The pressure reducer assembly (100) is characterized in that the piston rod (132) includes an interaction protrusion (133). The pressure reducer assembly (100) further includes an adjusting device (140) comprising an actuating part (141, 143) and an adjusting part (142). The adjusting part (142) is configured to functionally interact with the interaction protrusion (133) such that a maximum axial movement of the piston rod (132) is adjustable by actuating the actuating part (141), particularly by manually actuating the actuating part (141).

15 Claims, 11 Drawing Sheets

PRESSURE REDUCER ASSEMBLY

TECHNICAL FIELD

The present disclosure relates to a pressure reducer assembly. More specifically, the present disclosure relates to the pressure reducer assembly for adjustably reducing a pressure of a fluid, preferably a liquid, more preferably water and its application in irrigation systems.

BACKGROUND

A pressure reducer assembly may be used for reducing a supply (or inlet) pressure to a lower output pressure and further maintain this output pressure despite fluctuations in the supply pressure. The reduction of the inlet pressure to the lower output pressure is the key characteristic of the pressure reducer assembly.

The pressure reducer assembly generally includes a biasing means piston rod and a diaphragm operatively coupled with the piston rod in a pressure reducer chamber. The diaphragm is exposed to the output pressure in the pressure reducer chamber into which fluid is admitted by a valve cooperating with an inlet section of the pressure reducer chamber. The output pressure changes cause diaphragm movement which is transferred to movement of the valve via the biasing means piston rod for maintaining a selected output pressure.

The pressure reducer assembly may be mounted with shut-off irrigation systems or fluid application devices such as syringes, showers, brushing devices or drip irrigation components to reduce the inlet pressure which may approximately range up to 12 bar to avoid damage to components, leaks to the nozzle head, uneven spray patterns, among other drawbacks which may result from high fluid pressure. The pressure reducer assembly may limit the high inlet pressure of fluid to a maximum defined output pressure, which may for example be 3 bar. However, the mounting of pressure reducer assembly incurs additional cost and space.

In the known pressure reducer assemblies mounted with fluid application devices, the pressure reducer assembly is able to operate in different modes of operation. In a normal mode, the pressure reducer assembly reduces inlet pressure of fluid to maintain a selected lower output pressure. In an off mode, flow of fluid through the pressure reducer assembly is prevented to terminate operation of the fluid application device.

An example of a pressure reducer assembly is provided in European Patent EP 1 173 802 B1 (hereinafter referred to as '802 reference). The '802 reference provides a pressure regulator for supplying water to a poultry watering system or the like. The pressure regulator includes a control assembly for operating the pressure regulator in a normal mode, or an off mode. A desired operating pressure is set by loading a diaphragm responsive to output pressure changes. Diaphragm movement is transferred by the control system to a valve member cooperating with an inlet orifice. The control system includes a spring captured in a preloaded state between first and second end members, one connected to the valve member and the other connected to the diaphragm. A knob is rotated from a normal position to an off position and a collar pushes the end members together and pushes the valve member against the inlet orifice.

SUMMARY OF THE INVENTION

In view of the above, it is an objective of the present invention to solve or at least reduce the drawbacks discussed above. The objective is at least partially achieved by a pressure reducer assembly for adjustably reducing a pressure of a fluid, preferably a liquid, more preferably water.

According to an aspect of the present invention, the pressure reducer assembly includes a pressure reducer body that defines at least a part of a pressure reducer chamber along a central axis. The pressure reducer chamber includes an inlet section and an outlet section fluidly coupled with the inlet section. The inlet section is configured to allow an inflow of the fluid into the pressure reducer chamber. The outlet section is configured to allow an outflow of the fluid from the pressure reducer chamber. A biasing means piston rod having a center along the central axis connects the inlet section with the outlet section. The piston rod is axially moveable with respect to the pressure reducer body. The pressure reducer assembly is characterized in that the piston rod includes an interaction protrusion. The pressure reducer assembly further includes an adjusting device that includes an actuating part and an adjusting part. The adjusting part is configured to functionally interact with the interaction protrusion such that a maximum axial movement of the piston rod is adjustable by actuating the actuating part, particularly by manually actuating the actuating part.

Thus, the present disclosure provides an improved pressure reducer assembly that may be cost-effective, reliable, and simple in design. The pressure reducer assembly may reliably reduce wide range of fluid pressures at the inlet section of the pressure reducer chamber to an optimum acceptable fluid pressure at the outlet section of the pressure reducer chamber. The pressure reducer assembly may prevent component damage due to unreasonably high inlet fluid pressures in the systems it may be mounted to. The pressure reducer assembly includes the adjusting device that may functionally interact with the piston rod to advantageously adjust the maximum axial movement of the piston rod. The pressure reducer assembly, in addition to reducing the pressure of the inlet fluid, may further advantageously function as a shut-off valve. The adjusting device based on its rotation or linear movement may allow respectively disallow the movement of the fluid through the pressure reducer assembly.

According to an exemplary embodiment of the invention, the adjusting device may partially allow the movement of the fluid through the pressure reducer assembly. This may happen when the adjusting device may substantially, but not completely, limit the maximum axial movement of the piston rod. Further, the adjusting device may be geometrically designed to, substantially but not completely, limit or inhibit the maximum axial movement of the piston rod.

According to an exemplary embodiment of the invention, the adjusting device may be actuated in an automatic or semi-automatic manner using electronically operated control systems, smart phone applications, or other well-known systems known and commonly used in related art.

According to an exemplary embodiment of the invention, the pressure reducer body may be made of brass, plastic, and aluminum. Various grades of stainless steel (such as 303, 304, and 316) may also be used for the manufacture of the pressure reducer body. However, any other material available to handle various fluids and operating environments may be employed for making or manufacturing the pressure reducer body. Further, any suitable manufacturing process may be employed for manufacturing of the pressure reducer body without restricting the scope of the present disclosure.

The pressure reducer chamber includes the inlet section and the outlet section according to the present invention. This may denote that the pressure reducer chamber is defined respectively formed between the inlet section of the pressure reducer assembly and the outlet section of the pressure reducer assembly such that the outlet section and the inlet section are fluidly coupled with each other. Further, the inlet section is configured to allow the inflow of the fluid into the pressure reducer assembly, and the outlet section is configured to allow the outflow of the fluid from the pressure reducer assembly.

According to an exemplary embodiment of the invention, the inlet section may be parallel to and respectively aligned with the outlet section. According to another exemplary embodiment of the invention, the inlet section may be non-parallel to and respectively non-aligned with the outlet section. According to a further exemplary embodiment of the invention, the inlet section and the outlet section may be at an offset relative to each other. Additionally, the relative position of the inlet section and the outlet section may depend on application requirements, feasibility constraints, application device design, connecting element design, efficiency, among other factors.

The piston rod includes the interaction protrusion according to the present invention. This may denote that the piston rod includes a surface which may enable transfer of force from the adjusting device to the piston rod and vice-versa along the direction parallel to the direction of the central axis along which the pressure reducer chamber is defined. The presence or absence of this force transfer between the adjusting device and the piston rod may contribute to a regulation of the maximum axial movement of the piston rod.

The maximum axial movement of the piston rod according to the present invention is the maximum permissible movement of the piston rod along a direction which is parallel to the direction of the central axis of the pressure reducer assembly. The maximum axial movement of the piston rod (or the biasing means piston rod) may depend upon a spring length, pressure reducer chamber length, interaction with the adjusting device, among other factors. However, the force transfer from and therefore the interaction with the adjusting device may play a predominant part in adjusting the maximum axial movement of the piston rod. For example, if the force is transferred from the adjusting device to the piston rod, then the piston rod may be inhibited from movement. However, if the force is not transferred from the adjusting device to the piston rod, then the piston rod may achieve maximum axial movement of the piston rod.

The adjusting device according to the present invention is a device that includes the manually actuable actuating part such that upon actuation of the actuating part, the adjusting part of the adjusting device may functionally interact with the interaction protrusion of the piston rod to transfer force to the interaction protrusion and adjust the maximum axial movement of the piston rod.

According to an exemplary embodiment of the invention, an amount of an actuation of the actuating part is directly linked to an amount of a maximum axial movement of the piston rod. In other words, the maximum axial movement of the piston rod may be directly proportional to the amount of actuation of the actuating part. For example, complete actuation of the actuating part may lead to maximum axial movement of the piston rod and no actuation of the actuating part may lead to no axial movement of the piston rod. Thereby, the amount of maximum axial movement may be made easily visible for a user.

According to a further exemplary embodiment of the invention, partial actuation of the actuating part may lead to a limited maximum axial movement of the piston rod. In other words, if the maximum axial movement of the piston rod under complete actuation of the actuating part is say x units, then the maximum axial movement of the piston rod under partial actuation of the actuating part is less than x units and greater than zero or no movement.

According to an exemplary embodiment of the invention, the complete, partial or no actuation of the actuating part may lead to complete flow, partial flow or no flow respectively of the fluid from the inlet section of the pressure reducer chamber to the outlet chamber of the pressure reducer chamber. Partial flow of fluid may for example be particularly important when the pressure reducer assembly of the present invention is mounted in sprinkler or garden spray to vary the area, volume, or pattern of the fluid spray.

According to a further exemplary embodiment of the invention, the actuating part may be rotary or translatory such that that the rotary or translatory movement of the actuating part may transfer the force along the direction of the central axis of the pressure reducer chamber from the adjusting device to the interaction protrusion of the piston rod. The rotary or translatory movement of the actuating part may adjust the maximum axial movement of the piston rod along the central axis along which the pressure reducer chamber is defined. Any other possible movement type for the actuating part may be well within the scope of the present invention.

According to an exemplary embodiment of the invention, the adjusting device may produce a click sound, when the adjusting part may be positioned such that a force is transferable to the interaction protrusion included with the piston rod. Furthermore, the adjusting device may again produce the click sound, when the adjusting part may be positioned such that it may not transfer force to the interaction protrusion included with the piston rod. Hence, the force transfer between the adjusting device and the piston rod may be easily, reliably or accurately notified to an operator manually operating the actuating part of the adjusting device.

According to an exemplary embodiment of the invention, the adjusting part includes a scenery geometry portion. The scenery geometry portion is configured such that, when the scenery geometry portion is functionally interacting with the interaction protrusion, the scenery geometry portion is in contact with the interaction protrusion such that an axial force is introducible from the scenery geometry portion on the interaction protrusion, and the maximum axial movement of the piston rod is adjustable. The scenery geometry portion may be a portion of the adjusting part that may actually functionally interact with the interaction protrusion for axial force transfer between the adjusting device and the piston rod. The scenery geometry portion may functionally interact with the interaction protrusion upon actuation of the actuating part of the adjusting device. The scenery geometry portion may be located below the actuating part of the adjusting device such that the scenery geometry portion and the actuating part of the adjusting device may be functionally coupled with each other. In other words, any movement in the actuating part may be translated to the movement in the scenery geometry portion.

According to a further exemplary embodiment of the invention, the scenery geometry portion may be integrally formed with the actuating part or fixedly or removably coupled to the actuating part after the manufacturing by means of glue, welding, or other well-known bonding techniques.

According to a further exemplary embodiment of the invention, a portion of the scenery geometry portion may be functionally located within the pressure reducer chamber to facilitate better functional interaction with the interaction protrusion. Further, the scenery geometry portion may preferably be formed from a corrosion resistant, high strength, rigid material. The scenery geometry portion may be formed from stainless steel. The material of the scenery geometry portion may be similar or different to the actuating part. The scenery geometry portion may have strength enough to transfer axial force from the adjusting device to the piston rod. The scenery geometry portion may desirably not corrode due to the environment within the pressure reducer chamber.

According to a further exemplary embodiment of the invention, the scenery geometry portion may have a scenery geometrical shape and its size may be adapted dependent on the desired maximum axial movement of the piston rod and dependent on the desired maximum axial movement behavior of the piston rod. Further, the scenery geometry portion remains functional to transfer axial force when the actuating part of the adjusting device is actuated so as to adjust the maximum axial movement of the piston rod.

The axial force according to the present invention is defined as the force transferred between the adjusting part and the interaction protrusion along the direction of the maximum axial movement of the piston rod or along the direction of the central axis of the pressure reducer chamber. As already established, the axial force is introducible from the scenery geometry portion of the adjusting part on the interaction protrusion when the scenery geometry portion is in functional contact with the interaction protrusion.

The functional contact or interaction according to the present invention may substantially always establish a force transfer between the adjusting device and the piston rod.

According to an exemplary embodiment of the invention, the adjusting part further includes a stop portion. The stop portion is configured such that, when the stop portion is functionally interacting with the interaction protrusion, the stop portion is in contact with the interaction protrusion such that an axial force is introducible from the stop portion on the interaction protrusion, and the maximum axial movement of the piston rod is substantially inhibited. The scenery geometry portion and the stop portion may form adjacent portions of the adjusting part. A portion of the stop portion is functionally located within the pressure reducer chamber to facilitate optimum interaction with the interaction protrusion. When the maximum axial movement is substantially inhibited, in other words, the piston rod is held in a substantially closed position such that the valve is substantially closed.

According to an exemplary embodiment of the invention, the stop portion may have a shape and size corresponding to the interaction protrusion. However, any other geometrical design is within the scope of the present invention as long as the functionality of the stop portion remains intact. In other words, the stop portion irrespective of the geometrical design preference may functionally transfer axial force such that the maximum axial movement of the piston rod is substantially inhibited. Further, the stop portion may be a protrusion or bulged part included adjacent to the scenery geometry portion.

According to a further exemplary embodiment of the invention, the stop portion may be formed from a corrosion resistant, high strength, rigid material. The stop portion may be formed from stainless steel. The material of the stop portion may be similar or different to the remaining portion of the adjusting device respectively the scenery geometry portion. Further, the stop portion may be integrally formed with the scenery geometry portion or fixedly or removably coupled to the scenery geometry portion after the manufacturing by means of glue, welding, or other well-known bonding techniques.

According to an exemplary embodiment of the invention, the adjusting part further includes a guide portion. The guide portion is configured such that, when the guide portion is functionally interacting with the interaction protrusion, a contact between the adjusting part and the interaction protrusion is substantially completely disengaged, and the piston rod is substantially contact-free axially movable relative to the guide portion. When the functional interaction between the guide portion and the interaction protrusion may be established, the functional interaction between the stop portion and the interaction protrusion is disengaged to offer minimum or no resistance to a movement of the piston rod. In other words, the piston rod or the interaction protrusion may not experience any inhibiting force in the axial direction from the adjusting device that may otherwise inhibit the maximum axial movement of the piston rod.

According to a further exemplary embodiment of the invention, the guide portion may be formed from a material that may prevent wearing in the interaction protrusion as well as the guide portion.

According to a further exemplary embodiment of the invention, the guide portion may be integrally formed with the scenery geometry portion and/or the stop portion or fixedly or removably coupled to the scenery geometry portion and/or the stop portion after the manufacturing by means of glue, welding, or other well-known bonding techniques.

According to a further exemplary embodiment of the invention, the guide portion may have a geometric shape and size that may enable the functionality of the guide portion to inhibit a contact with the interaction protrusion and to inhibit an introduction of an axial force into the piston rod. Thereby, the overall compactness of the adjusting device may be improved. According to an exemplary embodiment of the invention, the adjusting device is positioned eccentrically to the central axis. The eccentric positioning of the adjusting device relative to the central axis may allow proper functioning of the components such as the piston rod and others in the pressure reducer chamber to accurately reduce the pressure of the fluid flowing through the pressure reducer chamber while still providing an add-on functionality of the shut-off valve in addition to the conventional pressure reduction function. Additionally, the eccentric positioning may allow a compact design of the pressure reducer assembly with additional functionality.

According to an exemplary embodiment of the invention, the actuating part is a rotary knob. Further, the interaction protrusion is formed as a radially extending protrusion extending from an outer surface of the piston rod, in particular about at least half of a circumference of the piston rod, further in particular about substantially an entire circumference of the piston rod. The rotary knob may be ergonomically and intuitively suitable for actuation of the adjusting device. Further, the rotary knob may be easily grabbed by the operator. Further, the rotary knob is simple in construction and simple to actuate even by the operator not skilled in the art.

The interaction protrusion may advantageously be formed around about at least half of the circumference of the piston rod, or about substantially the entire circumference of the piston rod such that if a portion of the interaction protrusion wears out or damages during operation of the pressure reducer assembly or regular interaction with the stop portion or the guide portion, the piston rod may simply be rotated to functionally recruit other portions of the interaction protrusion for interaction with the stop portion or the guide portion which were earlier not in any sort of interaction with the stop portion or the guide portion of the adjusting part. This may potentially avert recurrent maintenance and overhauling of the pressure reducer assembly. Additionally, forming the interaction protrusion around about half of the circumference and not about the entire circumference, weight may be saved and a more lightweight pressure reducer assembly may be provided.

According to a further exemplary embodiment of the invention, the shape and size of the interaction protrusion may be such that the overall design of the pressure reducer assembly remains compact. Further, the interaction protrusion may be able to properly and efficiently interact with the guide portion and/or the stop portion and/or the scenery geometry portion. The interaction protrusion may be formed segmented or a one complete unit as per the application requirement and feasibility.

According to a further exemplary embodiment of the invention, the interaction protrusion may be integrally formed with the piston rod or fixedly or removably coupled to the piston rod after the manufacturing by means of glue, welding, or other well-known bonding techniques. Further, the interaction protrusion may be formed from the corrosion resistant, high strength, rigid material to survive the environment presented to it within the pressure reducer chamber.

According to an exemplary embodiment of the invention, the adjusting part is formed such that the scenery geometry portion extends between the guide portion and the stop portion. The guide portion, the scenery geometry portion and the stop portion may be arranged at a free lower end of the adjusting device, wherein the free lower end is the end of the adjusting part opposite to the actuating part, in a manner such that they alternately functionally interact with the interaction protrusion of the piston rod. When the guide portion functionally interacts with the interaction protrusion of the piston rod, the piston rod does not experience any axial force from the adjusting device and hence an axial movement of the piston rod upon the maximum axial movement of the piston rod is possible. Hence, the piston rod may axially move completely free. When the scenery geometry portion or the stop portion functionally interacts with the interaction protrusion of the piston rod, the piston rod experiences an axial force such as to limit the maximum axial movement of the piston rod. Likewise, a maximum flow of fluid from the inlet section of the pressure reducer chamber to the outlet section of the pressure reducer chamber is allowed when the guide portion functionally interacts with the interaction protrusion. Further, a flow of fluid from the inlet section of the pressure reducer chamber to the outlet section of the pressure reducer chamber is limited when the scenery geometry portion functionally interacts with the interaction protrusion and substantially entirely inhibited when the stop portion functionally interacts with the interaction protrusion. Resultantly, the pressure reducer assembly of the present invention provides at the same time the functionality of the conventional pressure reducer and the conventional shut-off valve.

According to an exemplary embodiment of the invention, the actuating part is a lever. Further, the interaction protrusion is formed as a stop rib axially extending on an outer surface of the piston rod. The lever may be ergonomically suitable for actuation of the adjusting device. Further, the lever may be easily grabbed by the operator. Further, the lever is simple in construction and simple to actuate even by the operator not skilled in the art. The adjusting device includes a wedge-shaped scenery geometry portion coupled with the lever. The scenery geometry portion may functionally interact with the interaction protrusion. Further, the interaction protrusion functions as the stop rib such that when the stop rib functionally interacts with the wedge-shaped scenery geometry portion of the lever or the actuating part, the maximum axial movement of the piston rod may be inhibited.

According to an exemplary embodiment of the invention, the biasing means is a spring element. The spring element is functionally coupled with the piston rod and is configured to allow an axial movement of the piston rod along the central axis. The spring element may initially move from a compressed state to an expanded state when there is no functional interaction between the adjusting part and the interaction protrusion such that the spring element assists in pressure reducing by an axial movement of the piston rod. Further, when the normal working of the pressure reducer assembly is resumed, the spring element may expand and compress due to the pressure differences of the fluid near the outlet section and the inlet section of the pressure reducer assembly. Furthermore, when the operator actuates the actuating part such that the stop portion and the interaction protrusion functionally interact with each other, the spring element is entirely compressed. The spring element may preferably be a compression spring. The compression spring is a standardized component which is cheap and at the same time well approved. Therefore, the pressure reducer assembly may be provided cost-efficient and reliable.

According to a further exemplary embodiment of the invention, the spring element may further be a disc spring, or any other known type of spring commonly used to operate the piston rod. By providing the spring element as a disc spring, the pressure reduce assembly may have a decreased axial extension and a decreased axial receiving space.

According to a further exemplary embodiment of the invention, the spring element may wrap along an outer peripheral surface of the piston rod. In a further preferred embodiment of the invention, the biasing means may comprise a plurality of similar spring elements equidistantly positioned adjacent to each other along the outer peripheral surface of the piston rod such that the plurality of spring elements are oriented along the longitudinal direction or along the direction of the central axis of the pressure reducer assembly.

According to an exemplary embodiment of the invention, a sealing element is operatively coupled with the piston rod. The sealing element is configured to form a sealing between an inside surface of a fluid outflow device and an outer surface of the piston rod, and in particular the sealing element is a diaphragm. The sealing element may reliably disallow a backflow of fluid past the outlet section of the pressure reducer chamber. Thereby, possible leakages may be eliminated, and the overall efficiency of the pressure reducer assembly may be improved.

By providing the pressure reducer assembly that includes the diaphragm as the sealing element, a compact pressure reducer assembly which requires a small axial mounting area may be providable.

According to an exemplary embodiment of the invention, the pressure reducer assembly is configured to generate a constant output pressure of at least 1 bar, particularly of at least 3 bar, more particularly of substantially 4 bar. The constant output pressure may be pre-determined and pre-set during the manufacturing of the pressure reducer assembly according to the application requirements.

The output pressure according to the present invention may be defined as the fluid pressure at the outlet section of the pressure reducer chamber. Further, a supply pressure may be defined as the fluid pressure at the inlet section of the pressure reducer chamber. The pressure reducer assembly functions to reduce the supply pressure to the required output pressure and further maintain the constant output pressure for proper functioning of the system to which it may be mounted.

According to an exemplary embodiment of the invention, the pressure reducer assembly includes a valve at the inlet section of the pressure reducer chamber. The valve is configured to selectively allow and disallow a flow of fluid through the pressure reducer assembly. The valve may allow the passage of fluid to the outlet section such as to maintain the constant output pressure of the pressure reducer assembly, when the scenery geometry portion or the guide portion functionally interacts with the interaction protrusion. Alternatively, the valve may disallow the passage of fluid o the outlet section such as to inhibit a fluid flow, when the stop portion functionally interacts with the interaction protrusion. The piston rod may oscillate to momentarily decrease respectively increase the supply of fluid from the inlet section towards the outlet section.

According to a further aspect of the present invention, an irrigation system is provided. The irrigation system includes an above-described pressure reducer assembly. A fluid outflow device is configured to guide an outflow of the fluid from the pressure reducer assembly. The fluid outflow device is particularly a syringe, a shower, a brushing device, a cleaning device, or a drip irrigation component. The pressure reducer assembly is mounted to the fluid outflow device. The fluid outflow device includes a housing with an opening. The adjusting device is fixedly and movably mounted to the housing. The opening includes at least one first rib and the adjusting device includes at least one attachment part configured to mount the adjusting device to the opening, and comprising an end stop such that the first rib and the end stop are configured to interact with each other to limit a movement of the adjusting device relative to the opening. The pressure reducer assembly of the present disclosure may find its application with the irrigation system respectively the fluid outflow device usable for gardening operations. Therefore, a gardening tool may be provided with an increased service life and with which fluid may be spread more evenly. However, the irrigation system respectively the fluid outflow device may be usable for any other industrial or domestic application.

Further, the pressure reducer assembly may be easily, and reliably couplable to the irrigation system respectively the fluid outflow device.

Before discussing the invention with the help of the drawings, the invention will be briefly discussed in general. A pressure reducer assembly may be provided which may be switched on and switched off manually by the actuating part such as button, lever, or the rotary knob. The pressure reducer assembly thus additionally takes over the function of the shut-off valve. Thus, the operator may get two functions such as the pressure reduction function and the shut-off function one integral pressure reducer assembly.

The pressure reducer assembly according the present invention may have integrated shutdown mechanism for manual closing of the fluid supply. The pressure reducer assembly according to the present invention may perform two functions such as that of shut-off and the pressure reduction simultaneously. The pressure reducer assembly according to the present invention may be cost-effective compared to separate manual valve and pressure reducer. The pressure reducer assembly according to the present invention may have quantity control features in the form of the actuating part, which may be the rotary knob, lever, or the button. The pressure reducer assembly according to the present invention may be versatile in its usage. The pressure reducer assembly may be useable with a syringe, a shower, a brushing device, a cleaning devices or a drip irrigation component.

According to an exemplary embodiment of the invention, the piston rod may be provided with the interaction protrusion. According to an exemplary embodiment of the invention, the interaction protrusion may be used to induce the axial force onto the piston rod. According to a further exemplary embodiment of the invention, the axial force on the interaction protrusion may be generated by the scenery geometry on the rotary knob or by lever movement. Further, according to an exemplary embodiment of the present invention, the piston rod may be equipped with the diaphragm or a radial lip seal. According to a further exemplary embodiment of the present invention, the piston rod may be radially sealed by an O-ring. According to a further exemplary embodiment of the present invention, there may be the eccentrically arranged scenery geometry portion on the rotary knob or the lever, which depending upon the position of the rotary knob, or the lever may push the piston rod into an O-ring sealing seat. Additionally, when the piston ring may be pushed into the O-ring sealing seat, the valve may be tight and may disallow the flow of fluid through the pressure reducer assembly.

According to an exemplary embodiment of the present invention, when the scenery geometry and the stop rib may not be in intervention, the piston rod and the O-ring may not be in the intervention as well. Additionally, the piston rod may move freely in the axial direction. Additionally, the valve may be open and may consistently allow the flow of fluid through the pressure reducer assembly. According to an exemplary embodiment of the present invention, the pressure compensation for the piston rod may take place via the opening in the housing of the fluid outflow device.

Other features and aspects of this invention will be apparent from the following description and the accompanying drawings.

BRIEF DESCRIPTION OF THE DRAWINGS

The invention will be described in more detail with reference to the enclosed drawings, wherein.

DETAILED DESCRIPTION OF THE DRAWINGS

Figure 1:
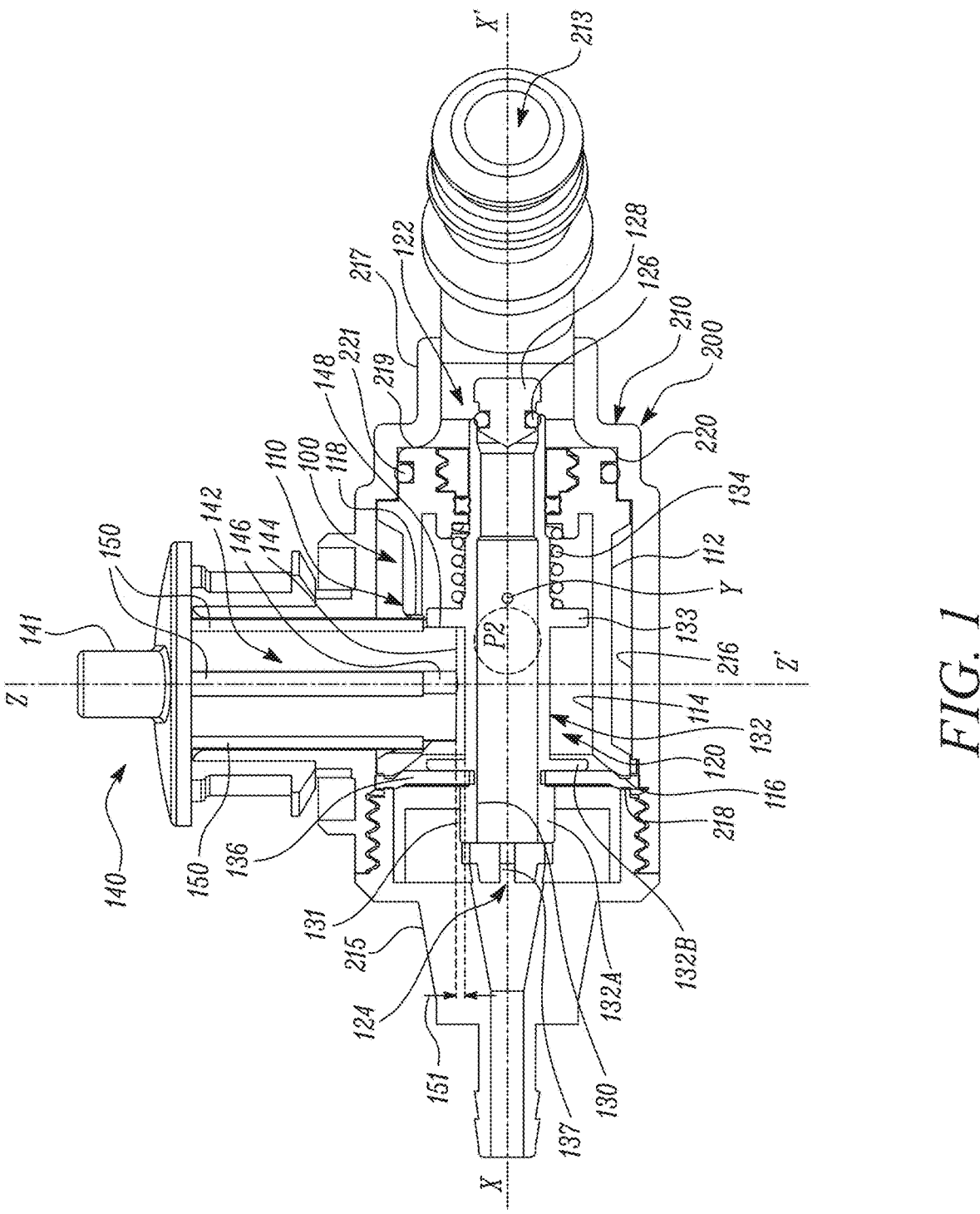
FIG. 1 illustrates a cross-sectional side view of a pressure reducer assembly with a rotary knob as an actuating part, in accordance with an exemplary embodiment of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a pressure reducer assembly 100 according to an exemplary embodiment of the present invention. The pressure reducer assembly 100 is used for adjustably reducing a pressure of a fluid. The fluid is preferably a liquid, and more preferably water as water is the most frequently used fluid for various applications such as watering of lawns, cleaning, firefighting among others. Thus, in the present disclosure, fluid or liquid may interchangeably be used for water and vice versa.

Figure 2:
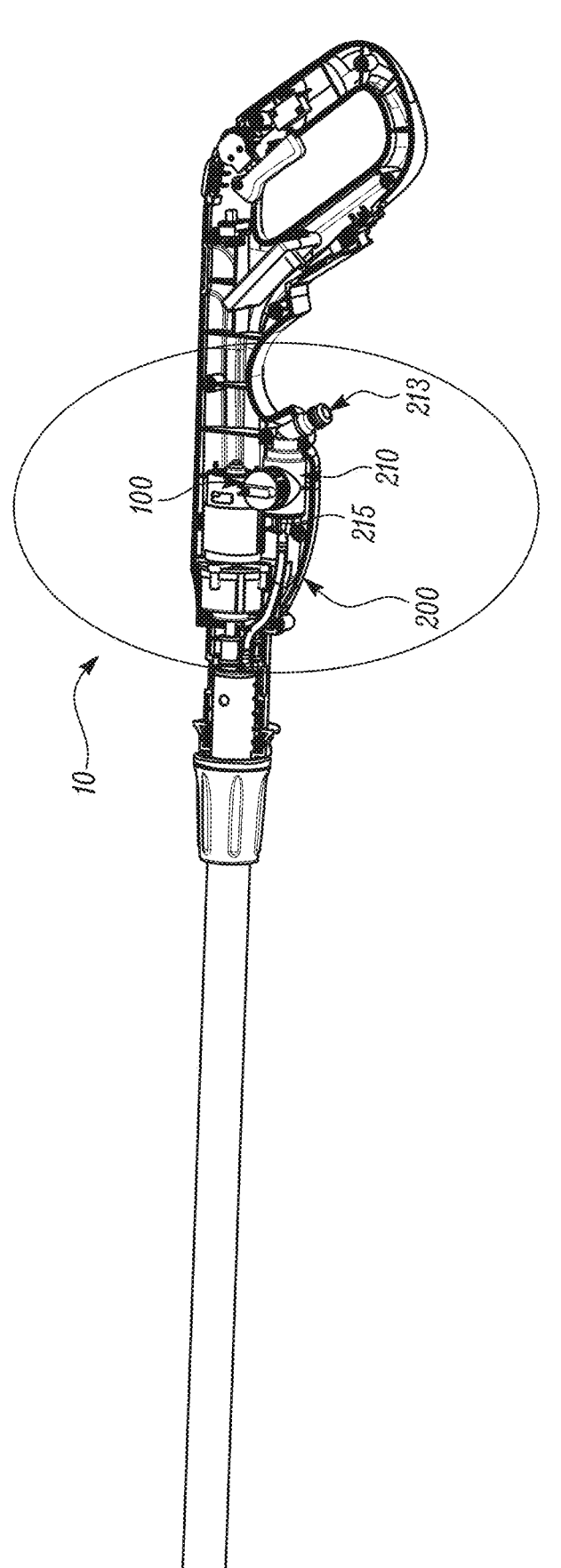
FIG. 2 illustrates a cross-sectional side view of a fluid outflow device comprising a pressure reducer assembly, in accordance with an exemplary embodiment of the present disclosure.
Figure 3:
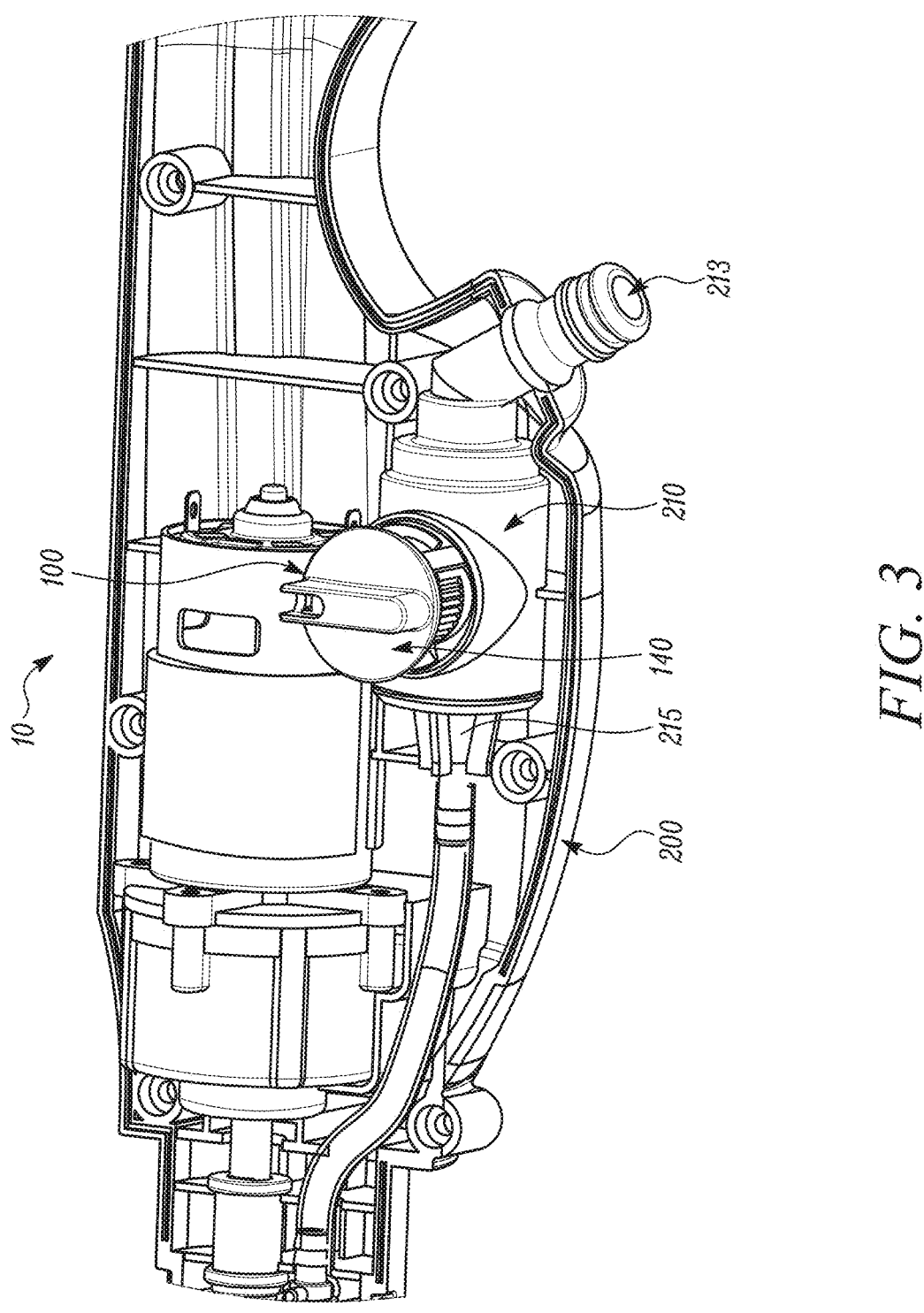
FIG. 3 illustrates a zoomed cross-sectional side view of an encircled portion of the fluid outflow device illustrated in FIG. 2, in accordance with an exemplary embodiment of the present disclosure.

The pressure reducer assembly 100 may be mounted in an irrigation system 10. FIGS. 2 and 3 illustrate the irrigation system 10 that includes a fluid outflow device 200 that comprises the pressure reducer assembly 100 and that is embodied as a handheld cleaning device 200. The fluid outflow device 200 is configured to guide an outflow of the fluid from the pressure reducer assembly 100. The fluid outflow device 200 may be used for providing fluid for various industrial and domestic applications such as, but not limited to, cleaning.

The fluid outflow device 200 shown in FIGS. 2 and 3 is a handheld cleaning device. FIG. 2 illustrates a cross-sectional side view of the cleaning device that comprises the pressure reducer assembly 100. FIG. 3 illustrates a zoomed cross-sectional side view of an encircled portion of the cleaning device that comprises the pressure reducer assembly 100.

The fluid outflow device 200 includes a housing 210 as illustrated in FIGS. 1, 2 and 3. The housing 210 includes an inlet port 213. The inlet port 213 may receive water for operation from a water source (not shown). The inlet port 213 may supply water received from the water source to the pressure reducer assembly 100. The housing 210 further includes the outlet port 215 which is according to the illustrated embodiment formed as a nipple 215. The outlet port 215 may receive water from the pressure reducer assembly 100 and may guide the water out of the pressure reducer assembly 100 for further applications.

As shown in FIG. 1, the outlet port 215 includes a sealing protrusion 218. Further, the housing 210 includes an inside surface 216 and an outside surface 217. The inside surface 216 is disposed opposite to the outside surface 217. The inside surface 216 includes an axial end face 219 and a radial end face 220. The axial end face 219 axially supports a pressure reducer body 110 of the pressure reducer assembly 100. In other words, the axial end face 219 provides a seat for the pressure reducer body 110. The pressure reducer body 110 is form-fitted or friction fitted with the inside surface 216 of the housing 210. The pressure reducer body 110 is quickly and ergonomically mounted to the housing 210 because its outer diameter is adjusted to an inner diameter of the housing 210 of the fluid outflow device 200. In other words, the pressure reducer body 100 is mounted, preferably screw-less mounted, into the housing 210 of the fluid outflow device 200.

The pressure reducer body 110 of the present disclosure is a cylindrical body having a central axis X-X' along a longitudinal or axial direction of the pressure reducer assembly 100. The pressure reducer body 110 includes an outer surface 112 and an inner surface 114. The outer surface 112 is disposed opposite to the inner surface 114.

A scaling ring 221 radially seals the outer surface 112 of the pressure reducer body 110 and the inside surface 216 of the housing 210. The sealing ring 221 may prevent leakage of water received via the inlet port 213. The sealing ring 221 is positioned in a groove in the outer surface 112 of the pressure reducer body 110. The sealing ring 221 on its radially outer surface contacts the inside surface 216 of the housing 210. The sealing ring 221 is sandwiched between the outer surface 112 of the pressure reducer body 110 and the radial end face 220 of the housing 210. The sealing ring 221 is firmly pressed in a direction perpendicular to the direction of the central axis X-X' by the housing 210 and the pressure reducer body 110. The sealing ring 221 is radially pressed between the housing 210 and the pressure reducer body 110 for sealing. The scaling ring 221 may prevent leakage of water received from the water source towards the area of the fluid coupling between the pressure reducer body 110 and the housing 210 and then further to the external environment.

Further, as shown in FIG. 1, in the mounted state, the pressure reducer body 110 is completely enclosed by the housing 110. In other words, the pressure reducer body 110 is annularly separated from the external environment by the housing 210 of the fluid outflow device 200. The pressure reducer body 110 defines at least a part of a pressure reducer chamber 120 along the central axis X-X'. The inner surface 114 of the pressure reducer body 110 defines an annular boundary wall for the pressure reducer chamber 120. The pressure reducer chamber 120 includes an inlet section 122 and an outlet section 124 fluidly coupled with the inlet section 122. The inlet section 122 is configured to allow an inflow of the fluid into the pressure reducer chamber 120. The outlet section 124 is configured to allow an outflow of the fluid from the pressure reducer chamber 120.

The pressure reducer assembly 120 includes a valve 128. The valve 128 is disposed at the inlet section 122 of the pressure reducer chamber 120. The valve 128 is configured to selectively allow and disallow a flow of fluid (particularly water) through the pressure reducer assembly 100. The valve 128 selectively allows and disallows passage of water via the inlet section 122. The valve 128 selectively allows the passage of water to the outlet section 124 such as to support maintaining a constant output pressure of the pressure reducer assembly 100 and hence the irrigation system 10.

The valve 128 may be coupled to the inlet section 122 by any suitable means known in the art. However, in an exemplary embodiment, the valve 128 is screwed to the inlet section 122. The screw coupling between the valve 128 and the inlet section 122 may be established by corresponding threads on the one hand on a body structure of the valve 128 and on the other hand on the pressure reducer body 110. Alternatively, the screw coupling may be established by screwing the valve 128 to an internal thread of the pressure reducer body 110 by simultaneously cutting a thread on the body structure of the valve 128. Both may allow a movement of the valve 128 relative to the inlet section 122 along the longitudinal direction or the direction of central axis X-X' of the pressure reducer assembly 100 for example for adjusting purposes. The screw coupling between the valve 128 and the inlet section 122 allows for movement of the valve 128 relative to the inlet section 122 along the direction of the central axis X-X'. The movement of the valve 128 along the longitudinal direction of the pressure reducer assembly 100 may also help in adjusting the constant output pressure generated by the pressure reducer assembly 100. The valve 128 further includes a seal 126. The seal 126 may be O-ring or any other type of seal generally available in the related art.

According to an exemplary embodiment of the present disclosure, the inlet section 122 may include a filter element (not shown) located upstream of the valve 128. The valve 128 may be located downstream of the filter element in the direction of water flow. The filter element may be operatively coupled to the inlet section 122 such that the filter element filters water received from the water source before it enters the pressure reducer chamber 120. The filter element prevents clogging of the inlet section 122 and thereby promotes smooth operations of the pressure reducer assembly 100 and the irrigation system 10.

With continuous reference to FIG. 1, the pressure reducer assembly 100 further includes a biasing means piston rod 132. The piston rod 132 is a hollow rod allowing passage of water of which the pressure is to be reduced in the pressure reducer assembly 100. The piston rod 132 has a center Y along the central axis X-X'. The piston rod 132 connects the inlet section 122 with the outlet section 124. The piston rod 132 allows a fluid, particularly water, to flow from the inlet section 122 towards the outlet section 124. The piston rod 132 is located downstream of the valve 128. The seal 126 radially seals the piston rod 132. The piston rod 132 includes an inner surface 130 and an outer surface 131. The inner surface 130 is in touch with the water flowing through the piston rod 132 whereas the outer surface 131 faces the pressure reducer chamber 120 and/or the inside surface 216 of the housing 210.

A spring element 134 is the biasing means of the piston rod 132. The spring element 134 is functionally coupled with the piston rod 132 and is configured to allow an axial movement of the piston rod 132 along the central axis X-X'. The spring element 134 may provide enough spring force to operate the piston rod 132. The spring element 134 may have length enough to generate strength to operate the piston rod 132. The spring element 134 may not have strength more than what is required to operate the piston rod 132 as the greater strength of the spring element 134 leads to greater installation space of the spring element 134 and thus an unnecessary increase in size of the pressure reducer assembly 100. The spring element 134, as illustrated in FIG. 1, is a compression spring.

Further, the piston rod 132 may be concentric with the pressure reducer body 110 or the pressure reducer chamber 120. It should be emphasized that the piston rod 132 may alternatively have any other orientation relative to the earlier defined central axis X-X' in accordance with the operational feasibility of the pressure reducer assembly 100. The piston rod 132 of the present disclosure is axially moveable with respect to the pressure reducer body 110. The piston rod 132 is configured to oscillate back and forth substantially within the pressure reducer chamber 120. The piston rod 132 oscillates to momentarily block the supply of water from the inlet section 122 towards the outlet section 124. The back-and-forth motion of the piston rod 132 is due to differential force experienced by the piston rod 132. The piston rod 132 is forced to exhibit a downward stroke i.e., towards the inlet section 122 when the pressure at the outlet section 124 is larger than a predefined/preset constant output pressure. In other words, when the pressure at the outlet section 124 is more than required for the application for which the pressure reducer assembly 100 is intended for use. Further, the piston rod 132 exhibits an upward stroke i.e., towards the outlet section 124 when the pressure at the outlet section 124 is smaller than a predefined/preset constant output pressure. In other words, when the pressure at the outlet section 124 is less than the pressure required for the application for which the pressure reducer assembly 100 is intended for use.

Further, according to the present invention, water in the outlet section 124 is prevented from leaking back to the pressure reducer chamber 120 by a sealing element 136 operatively coupled with the piston rod 132. The sealing element 136 is configured to form a sealing a between the inside surface 216 of the fluid outflow device 200 and the outer surface 131 of the piston rod 132. The sealing element 136 disallows a backflow of water past the outlet section 124, thereby eliminating any possible leakage and improving the overall efficiency of the pressure reducer assembly 100 installed in the fluid outflow device 200.

Further, as shown in FIG. 1, the sealing element 136 is a diaphragm 136. By providing the pressure reducer assembly 100 that includes the diaphragm 136 as the scaling element 136, a compact pressure reducer assembly 100 which requires a small axial mounting area may be providable. For the purpose of the present disclosure, the scaling element 136 is now interchangeably written as the diaphragm 136. The diaphragm 136 communicates an excess water pressure at the outlet section 124 to the piston rod 132 for downward stroke of the piston rod 132.

The diaphragm 136 allows the sealing between the inside surface 216 of the fluid outflow device 200 and the outer surface 131 of the piston rod 132. The multiple usage or application of the diaphragm 136 means no separate sealing elements such as O-rings are required for the sealing. The diaphragm 136 provides an axial sealing between the outer surface 131 of the piston rod 132 and the radial sealing protrusion 218 of the outlet port 215.

As may be seen in FIG. 1, a radial outer part of the diaphragm 136 is axially sealed by clamping it between an axial outlet end face 116 of the pressure reducer body 110 and the radial sealing protrusion 218 of the outlet port 215. Thereby, the diaphragm 136 is securely held in place. In other words, an outer periphery of the diaphragm 136 is pressed or sandwiched by the pressure reducer body 110 and the nipple 215. Furthermore, an inner periphery of the diaphragm 136 is supported or sandwiched by a plurality of annular protrusions 132A, 132B formed on the outer surface 131 of the piston rod 132. The diaphragm 136 is well supported and stable against pressure differences in the pressure reducer chamber 120. The diaphragm 136 is prevented from any slippage or misplacement in the pressure reducer assembly 100 by virtue of the piston rod 132, the pressure reducer body 110, the housing 210 and the nipple 215.

Referring to the differential force experienced by the piston rod 132. The force experienced by the piston rod 132 is caused by the spring element 134 and the sealing element 136 operatively coupled with the piston rod 132 in the pressure reducer chamber 120. The direction of motion of the piston rod 132 at any particular time instant is governed by the direction of net force generated upon the piston rod 132 by the spring force caused by the spring element 134 and the fluid pressure force on the sealing element 136. For example, the piston rod 132 moves in upstream direction (as shown in FIG. 1) when the net force is in upstream direction due to higher amount of force generated by the fluid acting on the surface of the sealing element 136 relative to the spring force, particularly the restoring force, generated by the spring element 134. The upstream direction may be defined as the direction which is opposite to the direction of flow of water.

The constant output pressure generated by the pressure reducer assembly 100 may be adjusted by varying an initial distance or an initial gap between the piston rod 132, the valve 128 and the seal 126 during the manufacturing of the pressure reducer assembly 100 or just before mounting the pressure reducer assembly 100 to the housing 210 of the fluid outflow device 200. For example, the constant output pressure may be pre-determined and preset during the manufacturing of the pressure reducer assembly 100 according to the application requirements of the fluid outflow device 200 to which the pressure reducer assembly 100 is mounted. The pressure reducer assembly 100 is configured to generate a constant output pressure of at least 1.5 bar, particularly of at least 3 bar, more particularly of substantially 4 bar. Some applications may demand the constant output pressure of 4 bar while other applications such as drip heads and spray nozzles used for gardening operations may demand the constant output pressure of 1.5 bar.

Accordingly, the stiffness of the used spring element 134 is chosen dependent on the desired constant output pressure. Particularly, using a spring element 134 having a hard spring stiffness may result in a constant high output pressure, e.g., 4 bar. On the other hand, using a spring element 134 having a soft spring stiffness may result in a constant low output pressure, e.g., 1.5 bar. By increasing the initial distance or the initial gap between the piston rod 132, the valve 128 and the seal 126 a constant output pressure of 4 bar may be generated, while by comparatively reducing it, a constant output pressure of 1.5 bar may be generated.

Figure 4:
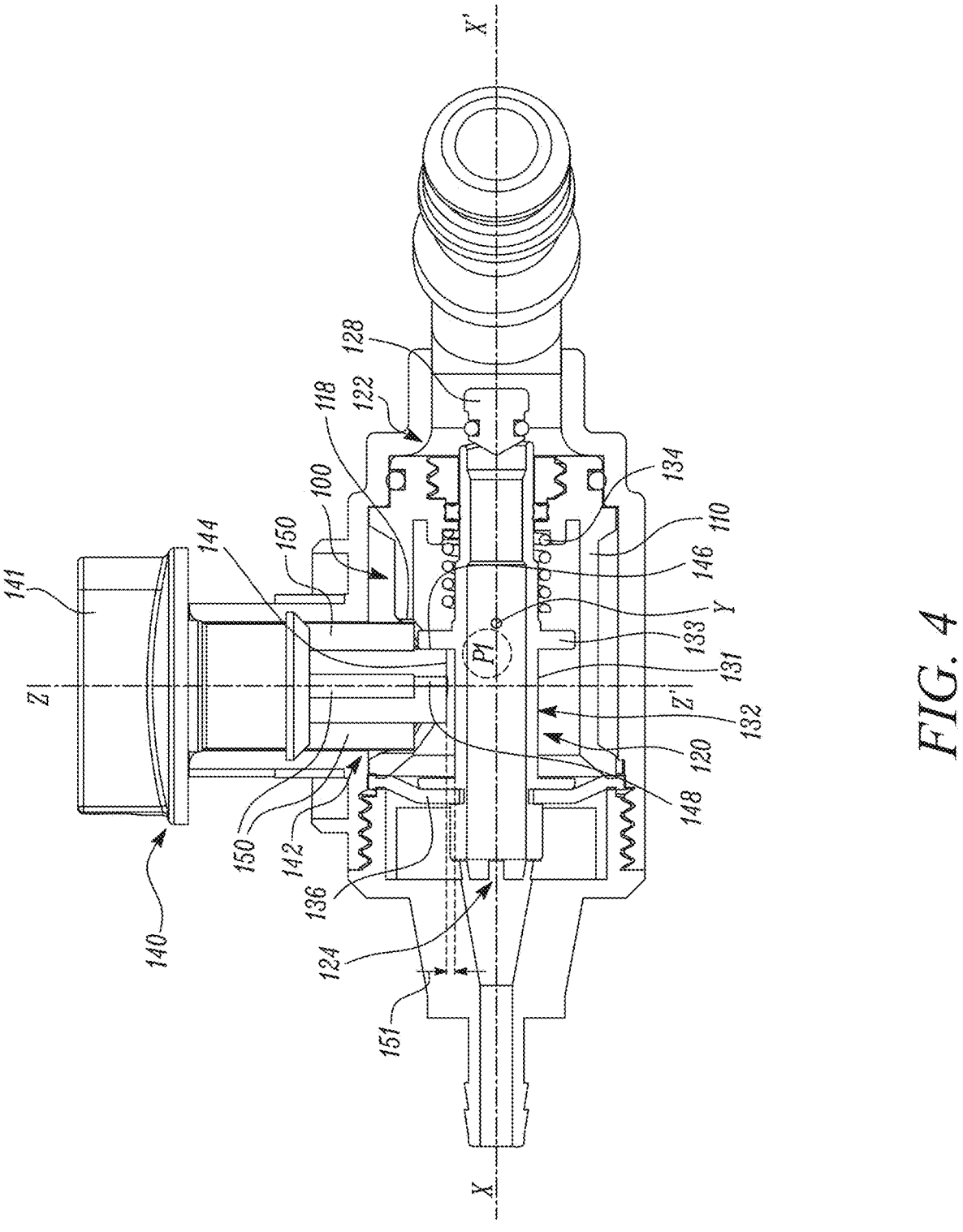
FIG. 4 illustrates another cross-sectional side view of a pressure reducer assembly with a rotary knob as an actuating part, in accordance with an exemplary embodiment of the present disclosure.
Figure 5:
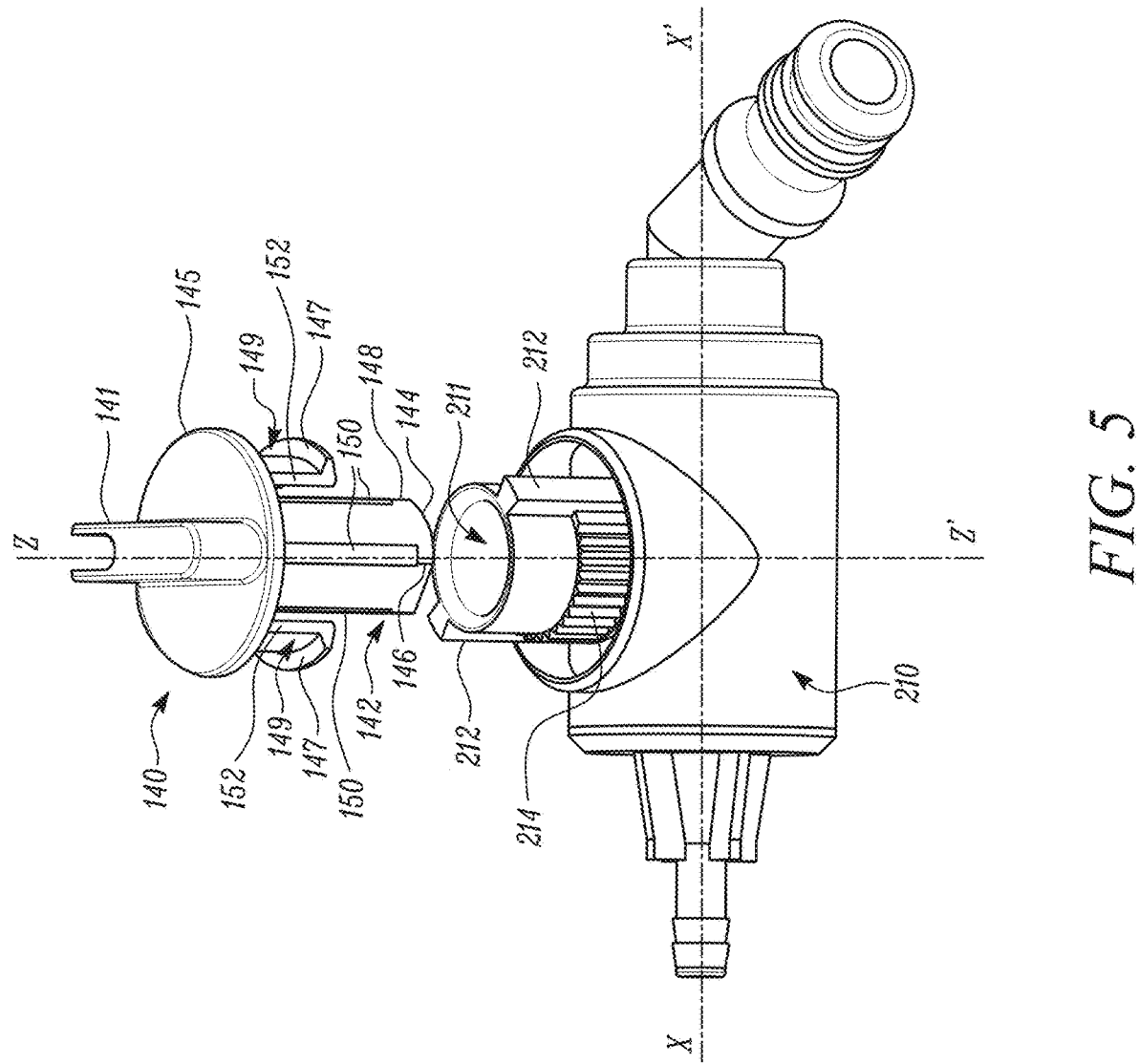
FIG. 5 illustrates a side perspective view of a housing and an adjusting device, in accordance with an exemplary embodiment of the present disclosure.

Further, as shown in FIG. 1, the pressure reducer assembly 100 includes the pressure reducer body 110 which further includes the pressure reducer chamber 120. The pressure reducer chamber 120 requires a pressure compensation feature to ensure unrestricted mobility of the piston rod 132. The pressure compensation feature is provided by an opening 211 (as shown in FIG. 5) provided with the housing 210. The opening 211 allows release of air pressure generated in the pressure reducer chamber 120 when the piston rod 132 moves in an upstream direction seen in a flow direction of the fluid through the pressure reducer assembly 100. The opening 211 allows air to flow out of the pressure reducer chamber 120 when the piston rod 132 moves in the upstream direction (as shown in FIG. 1). Conversely, the opening 211 allows suction of surrounding air (external to the pressure reducer assembly 100) when the piston rod 132 moves in a downstream direction seen in a flow direction of the fluid through the pressure reducer assembly 100 (as shown in FIG. 4). However, the scaling element 136 may prevent ingress of air in the outlet section 124, thereby preventing mixing of air drawn-in from the opening 211, with water.

The pressure reducer assembly 100 in addition to the pressure reduction of the water flowing from the inlet section 122 to the outlet section 124 is advantageously capable of functioning as a shut-off valve. Hence, as shown in FIGS. 1 and 4, the piston rod 132 of the pressure reducer assembly 100 includes an interaction protrusion 133. The pressure reducer assembly 100 further includes an adjusting device 140. The adjusting device 140 is positioned eccentrically to the central axis X-X'. The eccentric positioning of the adjusting device 140 relative to the central axis X-X' may allow proper functioning of the components such as the piston rod 132 and others in the pressure reducer chamber 120 to accurately reduce the pressure of the fluid flowing through the pressure reducer chamber 120 while still providing an add-on functionality of the shut-off valve in addition to the conventional pressure reduction function.

Further, the pressure reducer assembly of FIG. 4 is similar in construction or design to the pressure reducer assembly of FIG. 1. Further, FIGS. 1 and 4 illustrates the adjusting device 140 eccentrically positioned to the central axis X-X' along an axis Z-Z' which may be substantially perpendicular to the central axis X-X'. The adjusting device 140 includes an actuating part 141 and an adjusting part 142. The actuating part 141 and the adjusting part 142 are functionally coupled to each other such that any movement in the actuating part 141 translates into the movement in the adjusting part 142. The adjusting part 142 is configured to functionally interact with the interaction protrusion 133 such that a maximum axial movement of the piston rod 132 is adjustable by actuating the actuating part 141, particularly by manually actuating the actuating part 141. Further, an amount of an actuation of the actuating part 141 is directly linked to an amount of a maximum axial movement of the piston rod 132. In other words, the maximum axial movement of the piston rod 132 may be directly proportional to the amount of actuation of the actuating part 141. For example, complete actuation of the actuating part 141 may lead to maximum axial movement of the piston rod 132 and no actuation of the actuating part 141 may lead to no axial movement of the piston rod 132.

FIG. 4 shows the piston rod 132 with maximum axial movement whereas FIG. 1 shows the piston rod 132 with no axial movement. The position of the maximum axial movement of the piston rod 132 is denoted by "P1". Further, the position of the piston rod 132 with no axial movement is denoted by "P2". When the piston rod 132 is in position "P2", flow of water from the inlet section 122 to the outlet section 124 is inhibited. Further, when the piston rod 132 is in position "P1", water flows from the inlet section 122 to the outlet section 124. Additionally, water flows from the inlet section 122 to the outlet section 124 when the piston rod 132 is in any position between the position "P1" and the position"P2" which is different from the position "P2".

As illustrated in FIG. 4, the actuating part 141 is a rotary knob 141. The rotary knob 141 may be ergonomically suitable for actuation of the adjusting device 140. Further, the rotary knob 141 may be easily grabbed by the operator. Further, the rotary knob 141 is simple in construction and simple to actuate even by the operator not skilled in the art.

Further, as illustrated in FIG. 4, the interaction protrusion 133 is formed as a radially extending protrusion extending from the outer surface 131 of the piston rod 132. The interaction protrusion 133 extends in particular about at least half of a circumference of the piston rod 132, further in particular about substantially an entire circumference of the piston rod 132. If a portion of the interaction protrusion 133 wears out or damages during operation of the pressure reducer assembly 100, the piston rod 132 may simply be rotated to functionally recruit other portions of the interaction protrusion 133 for interaction with the adjusting part 142 which were earlier not in any sort of interaction with the adjusting part. This may potentially avert recurrent maintenance and overhauling of the pressure reducer assembly 100.

With continuous reference to FIGS. 1 and 4, the adjusting part 142 includes a scenery geometry portion 144. The scenery geometry portion 144 is configured such that, when the scenery geometry portion 144 is functionally interacting with the interaction protrusion 133, the scenery geometry portion 144 is in contact with the interaction protrusion 133 such that an axial force is introducible from the scenery geometry portion 144 on the interaction protrusion 133, and the maximum axial movement of the piston rod 132 is adjustable. The scenery geometry portion 144 may be a portion of the adjusting part 142 that may actually functionally interact with the interaction protrusion 133 for axial force transfer between the adjusting device 140 and the piston rod 132.

The scenery geometry portion 144 may functionally interact with the interaction protrusion 133 upon actuation of the actuating part 141 of the adjusting device 140. When the scenery geometry portion 144 functionally interacts with the interaction protrusion 133, the piston rod 132 moves to position "P2". The scenery geometry portion 144 is located below the actuating part 141 of the adjusting device 140 such that the scenery geometry portion 144 and the actuating part 141 of the adjusting device 140 may be functionally coupled with each other. In other words, any movement in the actuating part 141 may be translated to the movement in the scenery geometry portion 144.

The adjusting part 142 further includes a stop portion 148. The stop portion 148 is configured such that, when the stop portion 148 is functionally interacting with the interaction protrusion 133, the stop portion 148 is in contact with the interaction protrusion 133 such that the axial force is introducible from the stop portion 148 on the interaction protrusion 133, and the maximum axial movement of the piston rod 132 is substantially inhibited.

Additionally, the adjusting part 142 comprises at least two, preferably four (as illustrated in FIG. 1), bearing ribs 150. Each of the bearing ribs 150 extend along a main extension of the adjusting part 142 and parallel to the axis Z-Z'. The four bearing ribs 150 are arranged with a spacing of substantially 90° between two adjacent bearing ribs 150. Hence, the four bearing ribs 150 are evenly spaced from each other. The bearing ribs 150 are configured and are used for concentric bearing of the adjusting device 140 in the opening 211.

With continuous reference to FIGS. 1 and 4, the adjusting part 142 further includes a guide portion 146. The guide portion 146 is configured such that, when the guide portion 146 is functionally interacting with the interaction protrusion 133, a contact between the adjusting part 142 and the interaction protrusion 133 is disengaged, and the piston rod 132 is substantially contact-free axially movable relative to the guide portion 146.

The guide portion 146 may comprise two sub guide portions 146 arranged uniformly spaced by 180° from each other on the adjusting device 140 to allow a free axial movement of the piston rod 132. The two sub guide portions 146 may be cubical or cuboidal in shape.

Further, the adjusting device 140 comprises the adjusting part 142 and the actuating part 143. The adjusting part 142 comprises the guide portion 146, the scenery geometry portion 144 and the stop portion 146, wherein the scenery geometry portion 144 extends between the stop portion 148 and the guide portion 146. The guide portion 146, the scenery geometry portion 144, and the stop portion 148 may be arranged in such a manner that they alternatively functionally interact with the interaction protrusion 133 of the piston rod 132. When the guide portion 146 functionally interacts with the interaction protrusion 133 of the piston rod 132, then the piston rod 132 does not experience any axial force from the adjusting device 140 and hence the maximum axial movement of the piston rod 132 is completely free until its end defined by constraints of the construction of the pressure reducer assembly 100. However, when the scenery geometry portion 144 functionally interacts with the interaction protrusion 133 of the piston rod 132, then the piston rod 132 experiences the axial force such as to adjust the maximum axial movement of the piston rod 132 to a desired value in-between a zero maximum axial movement and a completely free maximum axial movement until its end defined by constraints of the construction of the pressure reducer assembly 100.

Because of its arrangement on the adjusting part 142, the scenery geometry portion 144 lags behind the guide portion 146 in the upstream direction of the fluid flow when the guide portion 146 functionally interacts with the pressure reducer body 110 (as shown in FIG. 4). Thus, the piston rod 132 does not encounter any axial force that may inhibit the free axial movement of the piston rod 132.

Further, as illustrated in FIG. 4, the flow of fluid from the inlet section 122 of the pressure reducer chamber 120 to the outlet section 124 of the pressure reducer chamber 120 is allowed when the guide portion 146 functionally interacts with the interaction protrusion 133. Further, a flow of fluid from the inlet section 122 of the pressure reducer chamber 120 to the outlet section 124 of the pressure reducer chamber 120 is allowed when the scenery geometry portion 144 functionally interacts with the interaction protrusion 133. In contrast, as illustrated in FIG. 1, a flow of fluid from the inlet section 122 of the pressure reducer chamber 120 to the outlet section 124 of the pressure reducer chamber 120 is disallowed respectively inhibited when the stop portion 148 functionally interacts with the interaction protrusion 133. Resultantly, the pressure reducer assembly 100 of the present invention provides the functionality of the conventional pressure reducer and the conventional shut-off valve.

FIG. 5 illustrates a side perspective view of the housing 210 and the adjusting device 140 in a disassembled state. The housing 210 includes the opening 211. The opening 211 is a cylindrical opening. The adjusting device 140 is fixedly and movably mounted to the housing 210. The adjusting device 140 is rotatably mounted to the housing 210. The adjusting part 142 of the adjusting device 140 that includes the scenery geometry portion 144, the guide portion 146 and the stop portion 148 is completely enclosed by the opening 211 in an assembled state. The adjusting part 142 is not visible to the operator when the adjusting device 140 is mounted to the housing 210.

The opening 211 includes two first ribs 212 and the adjusting device 140 includes two attachment parts 149, wherein the attachment parts 149 are configured to mount the adjusting device 140 to the opening 211, and wherein each of the two attachment parts 149 comprises an end stop 152. The first rib 212 and the end stop 152 are configured to interact with each other to limit a rotational movement of the adjusting device 140 relative to the opening 211. The two first ribs 212 are spaced apart from each other by 180°. The two attachment parts 149 are positioned opposite to each other. In other words, the two attachment parts 149 are arranged on two different sides of the axis Z-Z'.

The at least one first rib 212 radially project from the outer surface of the opening 211. Further, the at least one first rib 212 extend along the length of the opening 211 along a direction parallel to the axis Z-Z'. The at least one attachment part 149 and the at least one stop end 152 extends in a downward direction from the outer periphery 145 of the adjusting device 140. The at least one attachment part 149 and the at least one end stop 152 extend along the axis Z-Z'. The at least one attachment part 149 is an hook-shaped part with a seating protrusion 147 at the lower end which is the end spaced apart from the outer periphery 145, and the respective end stop 152 at each of two circular end faces.

When the adjusting device 140 is mounted to the housing 210 and the fluid outflow device 200, the seating protrusion 147 geometrically interact with an outer housing of the fluid outflow device 200 such that the adjusting device is movably fixed to the outer housing of the fluid outflow device 200.

Further, the interaction of the end stops 152 and the two first ribs 212 allows that each of the two attachment parts 149 rotates between two first ribs 212. Further, the interaction between the two first ribs 212 and the end stops 152 allow a 90° turn of the rotary knob 141 which corresponds to a movement between a completely open position and a completely closed position of the pressure reducer assembly 100.

Further, the opening 211 comprises an engaging section 214 which extends in the circumferential direction between the two attachment parts 149. The engaging section 214 comprises a plurality of protrusions and indentions which are formed adjacent to each other. The plurality of protrusions and indentations are formed in a substantial zigzag shape and each extend parallel to the axis Z-Z'. The engaging section 214 is configured to interact with a latch nose 153 (shown in FIGS. 8 and 11) to ensure an angular position of the adjusting device 140 relative to the opening 211. Alternatively, ensuring the angular position of the adjusting device 140 relative to the opening 211 and therefore the housing 210 may be performed by using an O-ring instead of the engaging section 214 and the latch nose 153.

Figure 6:
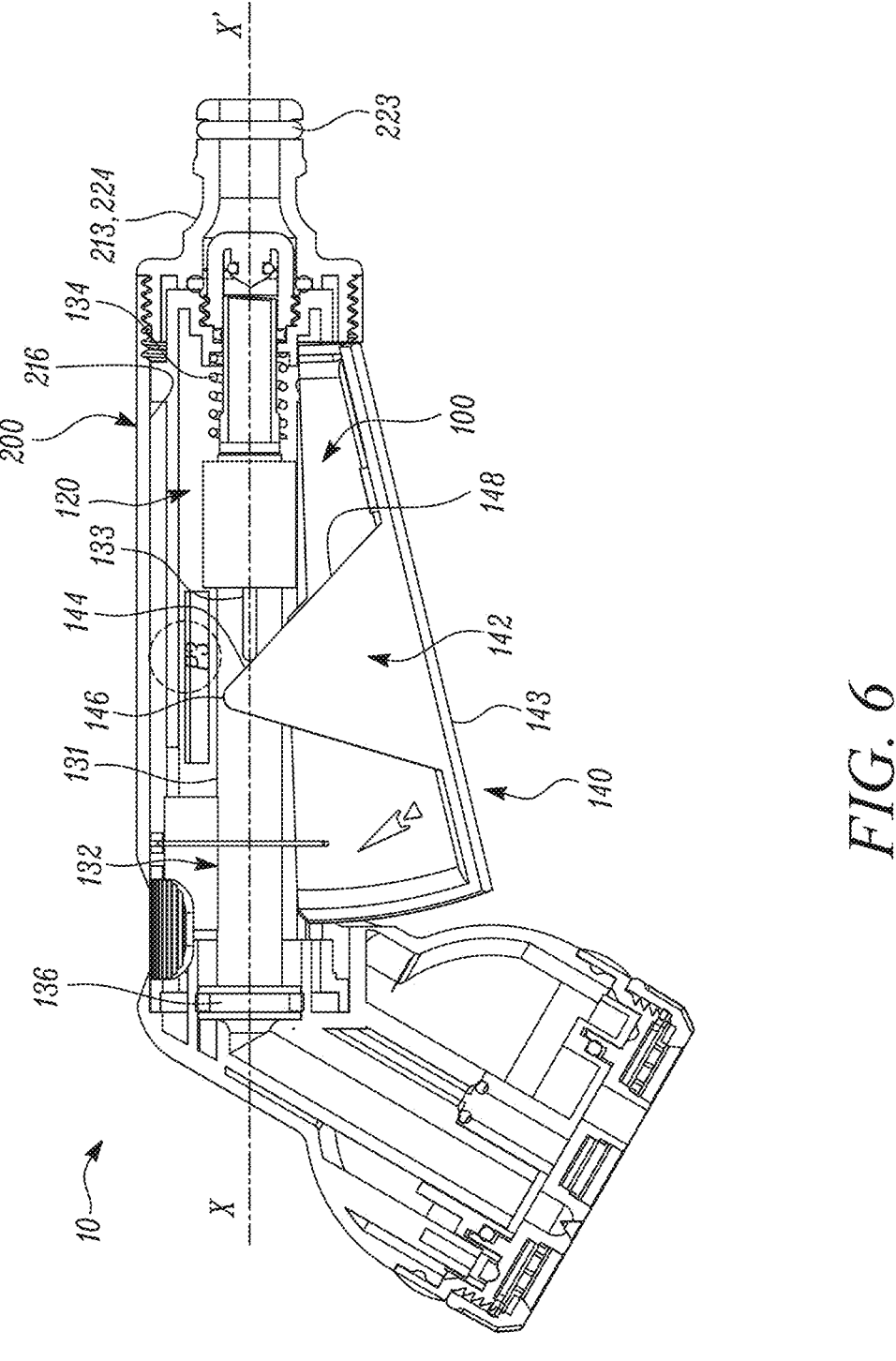
FIG. 6 illustrates a cross-sectional side view of a pressure reducer assembly with a lever as an actuating part, in accordance with an exemplary embodiment of the present disclosure.
Figure 7:
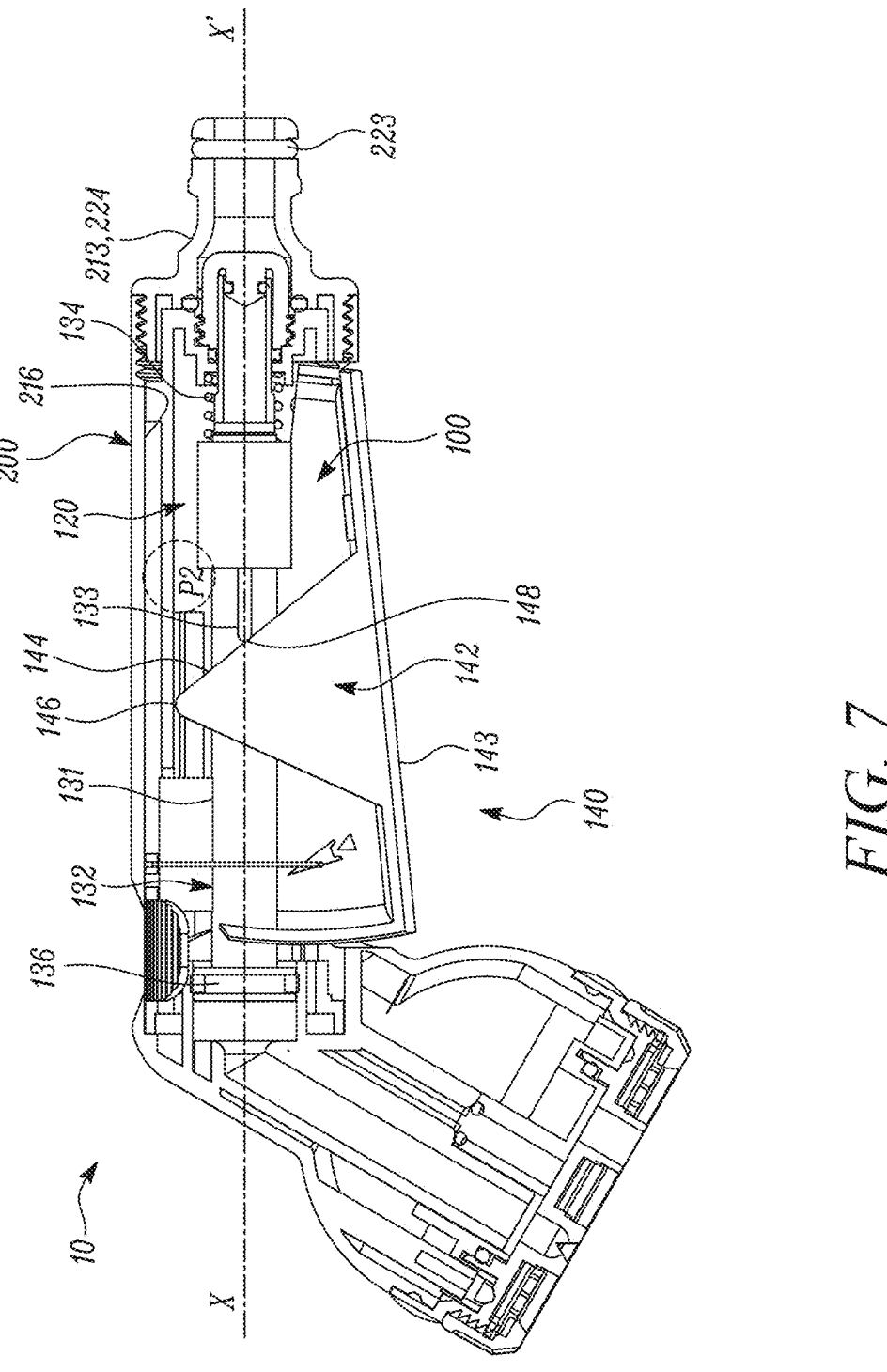
FIG. 7 illustrates another cross-sectional side view of a pressure reducer assembly with a lever as an actuating part, in accordance with an exemplary embodiment of the present disclosure.

According to an exemplary embodiment of the invention, the fluid outflow device 200 shown in FIGS. 6 and 7 is a shower. The shower 200 mounts the pressure reducer assembly 100. The pressure reducer assembly 100 is mounted in the shower of the irrigation system 10. The pressure reducer assembly 100 mounted in the shower and shown in FIGS. 6 and 7 also includes a similar pressure reducer chamber 120 and the associated components as with the pressure reducer assembly 100 mounted in the cleaning device as shown in FIGS. 1 and 4 along the central axis X-X'. However, contrary to the diaphragm 136 as the scaling element 136 shown in FIGS. 1 and 4, the pressure reducer assembly 100 illustrated in FIGS. 6 and 7 includes the radial lip 136 as the scaling element 136. Further, the shower includes a nipple 224 that functions as the inlet port 213. Further, the nipple 224 includes an O-ring 223 for fluid tight coupling with a water connection such as a hose (not shown in FIGS. 6 and 7). The nipple 224 is threadedly engaged to the inside surface 216 of the shower respectively the fluid outflow device 200.

The pressure reducer assembly 100 as illustrated in FIGS. 6 and 7 in addition to the pressure reduction of the water is further advantageously capable of functioning as a shut-off valve. As shown in FIGS. 6 and 7, the piston rod 132 of the pressure reducer assembly 100 includes the interaction protrusion 133. The pressure reducer assembly 100 further includes the adjusting device 140. The adjusting device 140 is positioned eccentrically to the central axis X-X'. The eccentric positioning of the adjusting device 140 relative to the central axis X-X' may allow proper functioning of the components such as the piston rod 132 and others in the pressure reducer chamber 120 to accurately reduce the pressure of the fluid flowing through the pressure reducer assembly 100 while still providing an add-on functionality of the shut-off valve in addition to the conventional pressure reduction function.

The adjusting device 140 includes the actuating part 143 and the adjusting part 142. The actuating part 143 and the adjusting part 142 are functionally coupled to each other such that any movement in the actuating part 143 translates into a movement in the adjusting part 142. The adjusting part 142 is configured to functionally interact with the interaction protrusion 133 such that the maximum axial movement of the piston rod 132 is adjustable by actuating the actuating part 143, particularly by manually actuating the actuating part 143. Further, the amount of the actuation of the actuating part 143 is directly linked to the amount of the maximum axial movement of the piston rod 132. In other words, the maximum axial movement of the piston rod 132 may be directly proportional to the amount of actuation of the actuating part 143. For example, complete actuation of the actuating part 143, particularly by a 90° turn, may lead to completely free axial movement of the piston rod 132 and no actuation of the actuating part 143 may lead to an inhibited axial movement of the piston rod 132.

FIG. 6 shows the piston rod 132 with maximum axial movement limited by an interaction of the scenery geometry portion 144 with the interaction protrusion 133. This is denoted as position "P3" in the following. FIG. 7 shows the piston rod 132 in position "P2", wherein the interaction protrusion 132 functionally interacts with the stop portion 148 such that no axial movement of the piston rod 132 is possible. In other words, such that the axial movement of the piston rod 132 is inhibited. When the piston rod 132 is in position "P2", a flow of water through the pressure reducer chamber 120 is substantially entirely inhibited. Further, when the piston rod 132 is in position "P3", a flow of water through the pressure reducer chamber 120 is allowed.

Further, as shown in FIGS. 6 and 7, the actuating part 143 is a lever 143. The lever 143 may be ergonomically suitable for actuation of the adjusting device 142. Further, the lever 143 may be easily grabbed by the operator. Further, the lever 143 is simple in construction and simple to actuate even by the operator not skilled in the art.

Further, the interaction protrusion 133 is formed as a stop rib 133 axially extending on the outer surface 131 of the piston rod 132. The adjusting device 140 includes a wedge-shaped scenery geometry portion 144 coupled with/formed on the lever 143. The scenery geometry portion 144 may functionally interact with the interaction protrusion 133 such that when the stop rib 133 functionally interacts with the scenery geometry portion 144 of the lever 143, the maximum axial movement of the piston rod 132 is individually adjustable.

The scenery geometry portion 144 is part of the adjusting part 142 of the adjusting device 140. The adjusting part 142 further includes the stop portion 148 as well as the guide portion 146. As illustrated in FIGS. 6 and 7, the scenery geometry portion 144 extends between the stop portion 148 and the guide portion 146. The stop portion 148 is configured such that, when the stop portion 148 is functionally interacting with the interaction protrusion 133, the stop portion 148 is in contact with the interaction protrusion 133 such that the axial force is introducible from the stop portion 148 on the interaction protrusion 133, and the maximum axial movement of the piston rod 132 is substantially inhibited.

Further, the adjusting part 142 further includes the guide portion 146. The guide portion 146 is configured such that, when the guide portion 146 is functionally interacting with the interaction protrusion 133, contact between the adjusting part 142 and the interaction protrusion 133 is disengaged, and the piston rod 132 is substantially contact-free axially movable relative to the guide portion 146.

Further, a flow of fluid through the pressure reducer chamber 120 is allowed when the guide portion 146 or the scenery geometry portion 146 functionally interacts with the interaction protrusion 133. Further, a flow of fluid through the pressure reducer chamber 120 is disallowed or inhibited when the stop portion 148 functionally interacts with the interaction protrusion 133. Resultantly, the pressure reducer assembly 100 of the present invention provides at the same time in one assembly the functionality of a pressure reducer and a shut-off valve.

During operation, the operator of the fluid application assembly 100 presses the lever 143 or rotates the rotary knob 141 from a switched off position of the pressure reducer assembly 100, also referred to as position "P2", to a plurality of switched-on positions of the pressure reducer assembly 100, also referred to as position "P1" and position "P3". In the switched-off position "P2", the pressure reduction and the water flow features are stopped. In the plurality of switched-on positions, particularly position "P1" and position "P3", the pressure reduction feature is on and a water flow through the pressure reducer chamber 120 is also allowed. The spring element 134 may initially move from a compressed state, as shown in FIG. 1 and FIG. 7, to a more expanded state as shown in FIG. 4 and FIG. 6. Further, during operation of the pressure reducer assembly 100, the spring element 134 may expand and compress due to the already discussed differential pressure in the pressure reducer chamber 120 and the water flow is momentarily decreased and increased from time to time. Furthermore, when the operator actuates the actuating part 141, 143 such that the scenery geometry portion 144 and the interaction protrusion 133 functionally interact with each other, the spring element 134 may not extend to its maximum extension.

Figure 8:
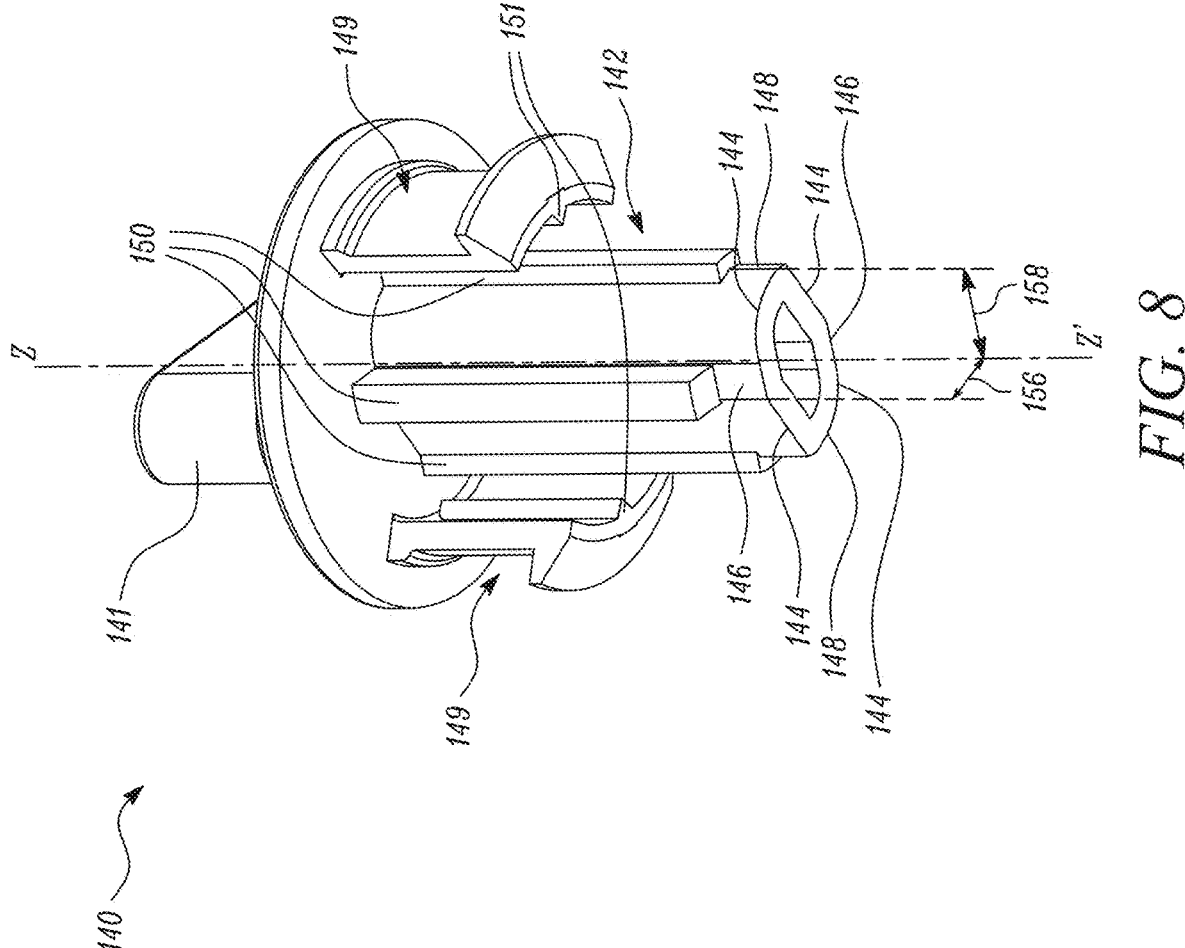
FIG. 8 illustrates a perspective view of a adjusting device, in accordance with an exemplary embodiment of the present disclosure.

FIG. 8 illustrates a perspective view of a adjusting device 140. The adjusting device 140 comprises four bearing ribs 150 of which three are shown in FIG. 8, two guide portions 146 spaced apart from each other by 180°, two stop portions 148 spaced apart from each other by 180° and spaced apart from the two guide portions 146 by 90°, and four scenery geometry portions 144 each extending between a guide portion 146 and an adjacent stop portion 148. Two of the four bearing ribs 150 are each formed in extension of a respective one of the two guide portions 146 and the other two bearing ribs 150 are each formed in extension of a respective one of the two stop portions 148.

The stop portion 148 comprises a stop width 158 which is configured to ensure that when the stop portion 148 is functionally interacting with the interaction protrusion 133, an axial movement of the piston rod 132 is inhibited. Further, the guide portion 146 comprises a guide width 156 which is configured to ensure that, when the guide portion 146 is functionally interacting with the interaction protrusion 133, the piston rod 132 may completely freely axially move with respect to the adjusting device 140. As shown in FIG. 8, the guide width 156 is smaller than the stop width 158. The guide width 146 corresponds to the length between the axis Z-Z' and an outer surface of the guide portion 146. The stop width 158 corresponds to the length between the axis Z-Z' and the stop portion 148.

Further, the adjusting device 140 comprises two latch noses 151. Each of the two latch noses 151 is formed on an inner surface of the respective one of the two attachment parts 149. The latch nose 151 is configured to engage with one of the indentions of the engaging section 214 (shown in FIG. 5) for fixing an angular position of the adjusting device 140 relative to the housing 210.

Figure 9:
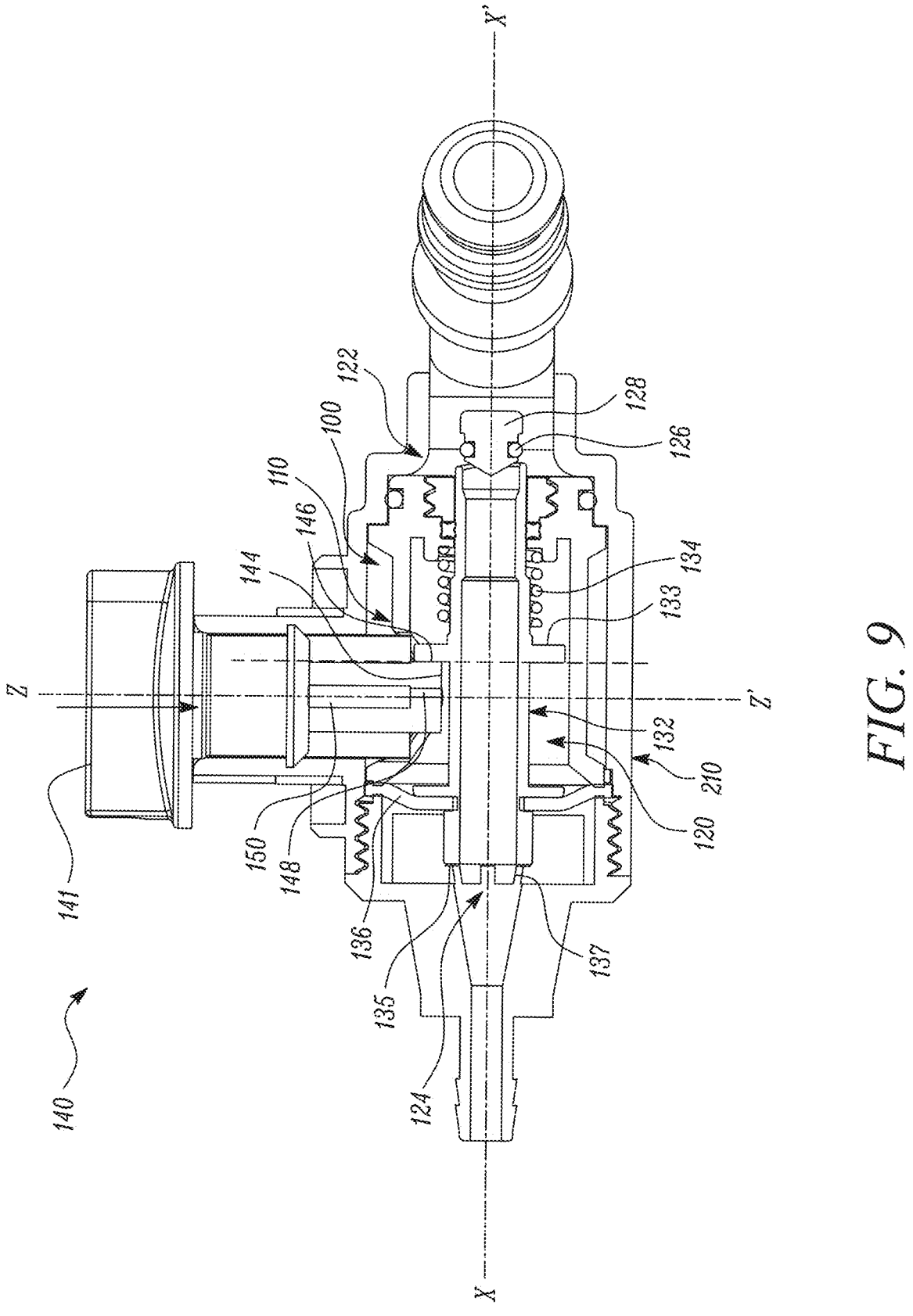
FIG. 9 illustrates a further cross-sectional side view of a pressure reducer assembly during mounting to a housing, in accordance with an exemplary embodiment of the present enclosure.

FIG. 9 illustrates a further cross-sectional side view of a pressure reducer assembly 100 during mounting to a housing 210, in accordance with an exemplary embodiment of the present enclosure. During mounting of the pressure reducer assembly 100 to the housing 210, the piston rod 132 is inserted in a direction of fluid flow, hence towards the outlet section 124 of the pressure reducer chamber 120 until an axial end 135 of the piston rod 132 abuts against an axial end stop structure 137. The axial end stop structure 137 is formed and configured to determine an axial position of the piston rod 132. Further, in the determined axial position, the adjusting device 140 may be inserted into the opening 211, wherein the interaction protrusion 133 is in an axial position such that the guide portion 146 may pass the interaction protrusion 133 without interaction with the interaction protrusion 133 (shown in FIG. 9 by the dashed line) during a movement in a direction parallel to the axis Z-Z' (shown in FIG. 9 by the downward pointing arrow). In contrast, as illustrated in FIG. 1, when the stop portion 148 functionally interacts with the interaction protrusion 133, the axial end 135 of the piston rod 132 is not in contact with the axial end stop structure 137.

Figure 10:
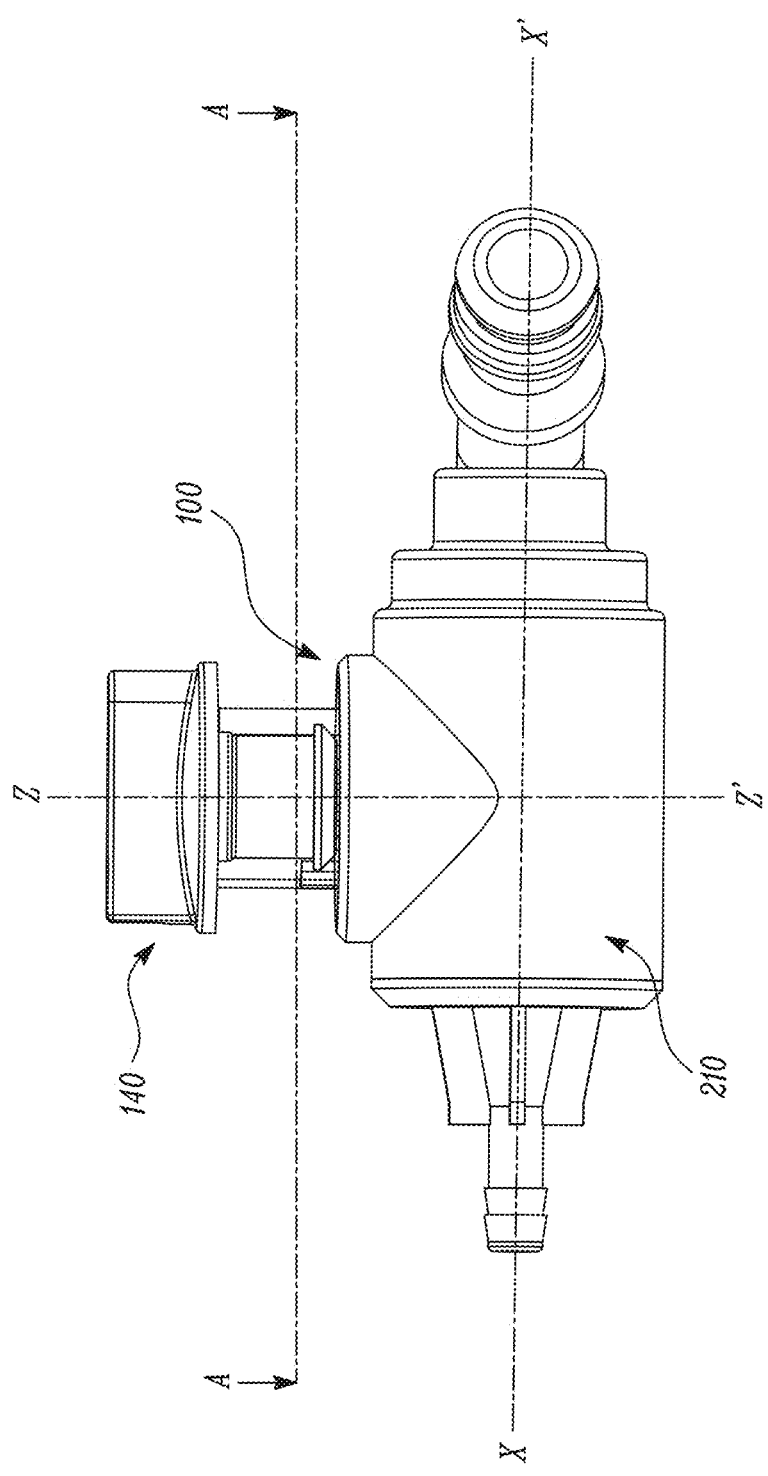
FIG. 10 illustrates a side view of a pressure reducer assembly mounted to a housing, in accordance with a further exemplary embodiment of the present disclosure.

FIG. 10 illustrates a side view of a pressure reducer assembly 100 mounted to a housing 210 in a position in which the guide portion 146 functionally interacts with the interaction protrusion 133 and therefore, the piston rod 132 may freely axially move.

Figure 11:
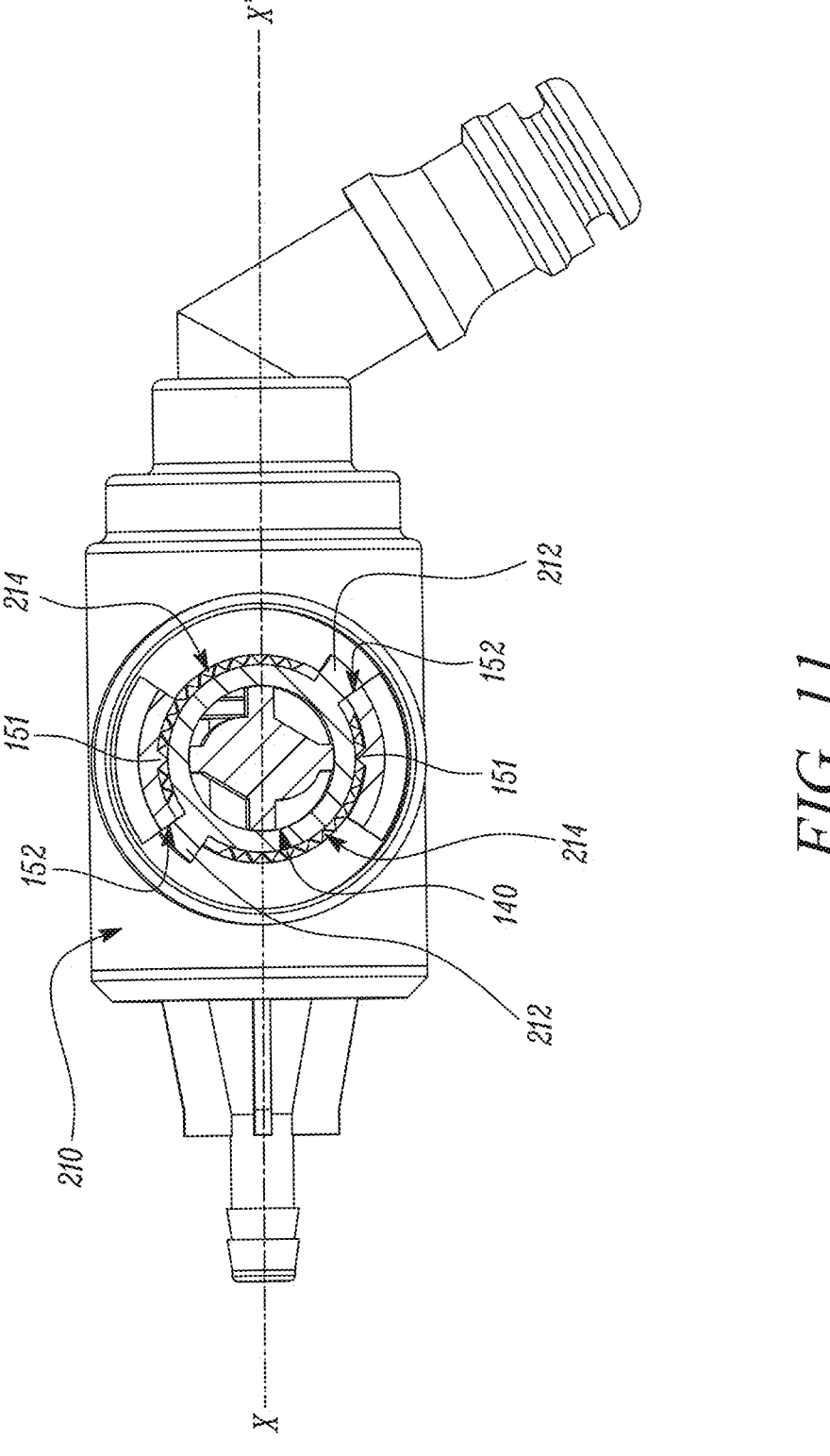
FIG. 11 illustrates the pressure reducer assembly mounted to the housing of FIG. 10 in a cross-section along A-A, in accordance with an exemplary embodiment of the present disclosure.

FIG. 11 illustrates the pressure reducer assembly 100 mounted to the housing 210 of FIG. 10 in a cross-section along A-A. Each of the two first ribs 212 is in contact with a respective one of the two end stops 152. Thereby, a further rotational movement in the circumferential direction of the adjusting device 140 is inhibited. Further, the two latch noses 153 each engage with a respective indention of one of the engaging sections 214. Thereby, the angular position of the adjusting device 140 relative to the housing 210 is defined and is kept also during using the fluid outflow device 200.

Therefore, the pressure reducer assembly 100 has a cost-efficient design, which is at the same time less error-prone due to less complex parts. Further, there is provision for quantity control via the rotary knob 141 or lever 143. Further, the pressure reducer assembly 100 has versatile applications for example in showers and cleaning devices.

Thus, the present disclosure provides an improved pressure reducer assembly 100 that may be cost-effective, reliable, and simple in design. The pressure reducer assembly 100 includes the adjusting device 140 that may functionally interact with the piston rod 132 to advantageously adjust the maximum axial movement of the piston rod 132. The pressure reducer assembly 100 may at the same time reduce the pressure of the inlet fluid as well as function as a shut-off valve. The adjusting device 140 based on its rotation or linear movement may either allow or disallow the movement of the fluid through the pressure reducer assembly 100.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

10 Irrigation System
100 Pressure Reducer Assembly
110 Pressure Reducer Body
112 Outer Surface
114 Inner Surface
116 Axial Outer End Face
118 Mid-face
120 Pressure Reducer Chamber
122 Inlet Section
124 Outlet Section
126 Seal
128 Valve
130 Inner Surface
131 Outer Surface
132 Piston Rod
132A, 132B Annular Protrusions
133 Interaction Protrusion
134 Spring Element
135 Axial End
136 Sealing Element, Diaphragm, Radial Lip
137 Axial End Stop Structure
140 Adjusting Device
141 Actuating Part, Rotary Knob
142 Adjusting Part
143 Actuating Part, Lever
144 Scenery geometry portion
145 Outer Periphery
146 Guide Portion
147 Seating Protrusion
148 Stop Portion
149 Attachment Part
150 Bearing Rib 152 Stop End
200 Fluid Outflow Device
210 Housing
211 Opening
212 First Rib
213 Inlet Port
214 Engaging Section
215 Outlet Port/Nipple
216 Inside Surface
217 Outside Surface
218 Radial Sealing Protrusion
219 Axial End Face
220 Radial End Face
221 Sealing Ring
223 O-ring
224 Nipple
X-X' Central Axis
Z-Z' Axis
Y Center
P1, P2 Position

The invention claimed is:

1. A pressure reducer assembly for adjustably reducing a pressure of a fluid, the pressure reducer assembly comprising:

a pressure reducer body defining at least a part of a pressure reducer chamber along a central axis, wherein the pressure reducer chamber comprises an inlet section and an outlet section fluidly coupled with the inlet section, wherein the inlet section is configured to allow an inflow of the fluid into the pressure reducer chamber, and wherein the outlet section is configured to allow an outflow of the fluid from the pressure reducer chamber, a biasing means piston rod having a center along the central axis, connecting the inlet section with the outlet section, and being axially moveable with respect to the pressure reducer body, wherein the piston rod comprises an interaction protrusion, wherein the pressure reducer assembly further comprises an adjusting device comprising an actuating part and an adjusting part, wherein the adjusting part comprises an asymmetric perimeter having a first portion, a second portion and a third portion, and wherein the asymmetric perimeter of the adjusting part is configured to functionally interact with the interaction protrusion such that a maximum axial movement of the piston rod is adjustable by actuating the actuating part.

2. The pressure reducer assembly according to claim 1, wherein an amount of an actuation of the actuating part is directly linked to an amount of a maximum axial movement of the piston rod.

3. The pressure reducer assembly according to claim 1, wherein the first portion of the asymmetric perimeter is configured such that, when the first portion is functionally interacting with the interaction protrusion, the first portion is in contact with the interaction protrusion such that an axial force is introducible from the first portion on the interaction protrusion, and such that the maximum axial movement of the piston rod is adjustable.

4. The pressure reducer assembly according to claim 1, wherein the second portion is configured such that, when the second portion is functionally interacting with the interaction protrusion, the second portion is in contact with the interaction protrusion such that an axial force is introducible from the second portion on the interaction protrusion, and such that the maximum axial movement of the piston rod is substantially inhibited.

5. The pressure reducer assembly according to claim 1, wherein the third portion is configured such that, when the third portion is functionally interacting with the inter-action protrusion, a contact between the adjusting part and the interaction protrusion is disengaged, and the piston rod is substantially contact-free axially movable relative to the third portion.

6. The pressure reducer assembly according to claim 1, wherein the adjusting device is positioned eccentrically to the central axis.

7. The pressure reducer assembly according to claim 1, wherein the actuating part is a rotary knob, herein the interaction protrusion is formed as a radially extending protrusion extending from an outer surface of the piston rod.

8. The pressure reducer assembly according to claim 5, wherein the adjusting part is formed such that the first portion extends between the second portion and the third portion.

9. The pressure reducer assembly according to claim 1, wherein the actuating part is a lever, and wherein the interaction protrusion is formed as a stop rib axially extending on an outer surface of the piston rod.

10. The pressure reducer assembly according to claim 1, wherein the biasing means is a spring element, wherein the spring element is functionally coupled with the piston rod and is configured to allow an axial movement of the piston rod along the central axis.

11. The pressure reducer assembly according to claim 1, further comprising a sealing element operatively coupled with the piston rod, wherein the sealing element is configured to form a sealing between an inside surface of a fluid outflow device and an outer surface of the piston rod, and wherein the sealing element is a diaphragm.

12. The pressure reducer assembly according to claim 1, wherein the pressure reducer assembly is configured to generate a constant output pressure of at least 1 bar.

13. The pressure reducer assembly according to claim 1, further comprising a valve at the inlet section of the pressure reducer chamber, and wherein the valve is configured to selectively allow and disallow a flow of fluid through the pressure reducer assembly.

14. An irrigation system comprising a pressure reducer assembly for adjustably reducing a pressure of a fluid, and a fluid outflow device configured to guide an outflow of the fluid from the pressure reducer assembly, wherein the pressure reducer assembly comprises: a pressure reducer body defining at least a part of a pressure reducer chamber along a central axis, wherein the pressure reducer chamber comprises an inlet section and an outlet section fluidly coupled with the inlet section, wherein the inlet section is configured to allow an inflow of the fluid into the pressure reducer chamber, and wherein the outlet section is configured to allow the outflow of the fluid from the pressure reducer chamber, a biasing means piston rod having a center along the central axis, connecting the inlet section with the outlet section, and being axially moveable with respect to the pressure reducer body, wherein the piston rod comprises an interaction protru-sion, wherein the pressure reducer assembly further comprises an adjusting device comprising an actuating part and an adjusting part, wherein the adjusting part is configured to functionally interact with the interaction protrusion such that a maximum axial movement of the piston rod is adjust-able by actuating the actuating part, wherein the fluid outflow device is a syringe, a shower, a brushing device, a cleaning device, or a drip irrigation component, wherein the pressure reducer assembly is mounted to the fluid outflow device, wherein the fluid outflow device comprises a housing with an opening, wherein the adjusting device is fixedly and movably mounted to the housing, wherein the opening comprises at least one first rib, wherein the adjusting device comprises at least one attachment part configured to mount the adjusting device to the opening, and comprising an end stop, and wherein the first rib and the end stop are configured to interact with each other to limit a movement of the adjusting device relative to the opening.

15. The irrigation system of claim 14, wherein the opening allows a pressure compensation of the pressure reducer assembly.

* * * * *